(12) United States Patent
Okajima et al.

(10) Patent No.: US 7,360,847 B2
(45) Date of Patent: *Apr. 22, 2008

(54) BICYCLE HUB

(75) Inventors: Shinpei Okajima, Osaka (JP); Kazuki Koshiyama, Osaka (JP)

(73) Assignee: Shimano Inc., Osaka (JP)

( * ) Notice: Subject to any disclaimer, the term of this patent is extended or adjusted under 35 U.S.C. 154(b) by 210 days.

This patent is subject to a terminal disclaimer.

(21) Appl. No.: 11/231,985

(22) Filed: Sep. 22, 2005

(65) Prior Publication Data

US 2006/0267399 A1    Nov. 30, 2006

Related U.S. Application Data

(63) Continuation-in-part of application No. 11/138,646, filed on May 27, 2005, now Pat. No. 7,306,292.

(51) Int. Cl.
*B60B 1/04* (2006.01)
*B60B 27/00* (2006.01)

(52) U.S. Cl. .................. 301/61; 301/59; 301/110.5
(58) Field of Classification Search .................. 301/55, 301/56, 57, 59, 61, 104, 110.5
See application file for complete search history.

(56) References Cited

U.S. PATENT DOCUMENTS

| | | | | |
|---|---|---|---|---|
| 382,885 | A | * | 5/1888 | Latta ........................... 301/56 |
| 528,887 | A | * | 11/1894 | Myers .......................... 301/58 |
| 6,485,108 | B1 | * | 11/2002 | Tabe ............................ 301/59 |
| 6,520,595 | B1 | | 2/2003 | Schlanger |
| 6,899,401 | B2 | | 5/2005 | Schlanger |
| 7,070,245 | B2 | * | 7/2006 | Tanaka ......................... 301/59 |
| 2001/0054840 | A1 | * | 12/2001 | Schlanger ..................... 301/59 |
| 2004/0130204 | A1 | * | 7/2004 | Schlanger ..................... 301/59 |
| 2004/0262983 | A1 | | 12/2004 | Tanaka |
| 2005/0067881 | A1 | | 3/2005 | Schlanger |

FOREIGN PATENT DOCUMENTS

DE    697 15 266 T3    5/2006
JP    H08-108701 A     4/1996

* cited by examiner

*Primary Examiner*—Russell Stormer
*Assistant Examiner*—Kip T Kotter
(74) *Attorney, Agent, or Firm*—Global IP Counselors, LLP

(57) ABSTRACT

A bicycle hub includes an axle, a hub shell and a plurality of fixing elements. The hub shell is rotatably disposed about the axle. The hub shell has a plurality of fixing portions disposed at an end thereof. Each of the fixing portions has a pair of spoke guide openings. The spoke guide openings are preferably unthreaded closed bores. The fixing elements are removably coupled to the fixing portions of the hub shell. Each of the fixing elements includes a pair of spoke attachment structures to receive inner ends of a pair of spokes. Preferably, the spoke attachment structures include threaded spoke attachment openings. Preferably, the fixing portions and the fixing elements are configured and arranged such that each of the fixing elements contacts an exterior surface of the hub shell when assembled together.

25 Claims, 25 Drawing Sheets

BICYCLE HUB

CROSS-REFERENCE TO RELATED APPLICATIONS

This application is a continuation-in-part (CIP) application of U.S. patent application Ser. No. 11/138,646 filed on May 27, 2005 (pending). The entire disclosures of U.S. patent application Ser. No. 11/138,646 is hereby incorporated herein by reference.

BACKGROUND OF THE INVENTION

1. Field of the Invention

This invention generally relates to a bicycle hub for a bicycle wheel. More specifically, the present invention relates to a bicycle hub for a bicycle wheel that has fixing elements with a pair of spoke attachment structures to attach a pair of inner ends of a pair of spokes to the hub.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One component that has been extensively redesigned is the bicycle wheel. Bicycle wheels are constantly being redesigned to be strong, lightweight and more aerodynamic in design as well as to be simple to manufacture and assemble.

There are many different types of bicycle wheels, which are currently available on the market. Most bicycle wheels have a hub portion, a plurality of spokes and an annular rim. The hub portion is attached to a part of the frame of the bicycle for relative rotation. The inner ends of the spokes are coupled to the hub and extend outwardly from the hub. The annular rim is coupled to the outer ends of the spokes and has an outer portion for supporting a pneumatic tire thereon. Typically, the spokes of the bicycle wheel are thin metal wire spokes. The ends of the hub are usually provided with flanges that are used to couple the spokes to the hub. In particular, holes are provided in the hub flanges. The wire spokes are usually bent on their inner end and provided with a flange that is formed in the shape of a nail head. The inner end is supported in one of the holes in one of the hub flanges. The outer ends of the spokes typically are provided with threads for engaging spoke nipples, which secure the outer ends of the wire spokes to holes in the rim.

The above types of wheels have been designed for use with tube tires or tubeless tires. Typically, tubeless tire wheels have an annular seal arranged to seal the spoke attachment openings of the rim. Rims designed for tube tires also often have an annular member covering the spoke attachments. In any case, these typical types of wheels can be expensive and complicated to manufacture and assemble. Moreover, these typical wheels are not always as strong and lightweight, as desired. Furthermore, with these typical wheels it can be difficult, complicated and/or expensive to replace a spoke or spokes.

In view of the above, it will be apparent to those skilled in the art from this disclosure that there exists a need for an improved bicycle hub for a bicycle wheel. This invention addresses this need in the art as well as other needs, which will become apparent to those skilled in the art from this disclosure.

SUMMARY OF THE INVENTION

One object of the present invention is to provide a bicycle wheel with a bicycle hub that is relatively strong yet relatively lightweight.

Another object of the present invention is to provide a bicycle hub that is relatively simple and inexpensive to manufacture and assemble.

The foregoing objects can basically be attained by providing a bicycle hub comprising an axle, a hub shell and a plurality of fixing elements. The hub shell is rotatably disposed about the axle with a plurality of fixing portions disposed at opposite ends of the hub shell. The fixing elements are removably coupled to the fixing portions of the hub shell with each of the fixing elements having a pair of spoke attachment structures to attach a pair of inner ends of a pair of spokes to the hub shell.

The foregoing objects can also basically be attained by providing a bicycle hub that includes an axle, a hub shell and a plurality of fixing elements. The hub shell is rotatably disposed about the axle. The hub shell has a plurality of fixing portions disposed at an end thereof. Each of the fixing portions has a first spoke guide opening and a second spoke guide opening. The first and second spoke guide openings are unthreaded closed bores. The fixing elements are removably coupled to the fixing portions of the hub shell. Each of the fixing elements includes a first threaded spoke attachment opening arranged to receive an inner end of a first spoke and a second threaded spoke attachment opening arranged to receive an inner end of a second spoke. The first spoke attachment opening of each of the fixing elements is aligned with the first spoke guide opening of a corresponding one of the fixing portions when assembled together, and the second spoke attachment opening of each of the fixing elements is aligned with the second spoke guide opening of a corresponding one of the fixing portions when assembled together.

The foregoing objects can also basically be attained by providing a bicycle hub that includes an axle, a hub shell and a plurality of fixing elements. The hub shell is rotatably disposed about the axle. The hub shell has a plurality of fixing portions disposed at an end thereof. Each of the fixing portions has a first spoke guide opening and a second spoke guide opening. The fixing elements are removably coupled to the fixing portions of the hub shell. Each of the fixing elements includes a first spoke attachment structure arranged to attach an inner end of a first spoke and a second spoke attachment structure arranged to attach an inner end of a second spoke. The fixing portions and the fixing elements are configured and arranged such that each of the fixing elements contacts an exterior surface of the hub shell when assembled together.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
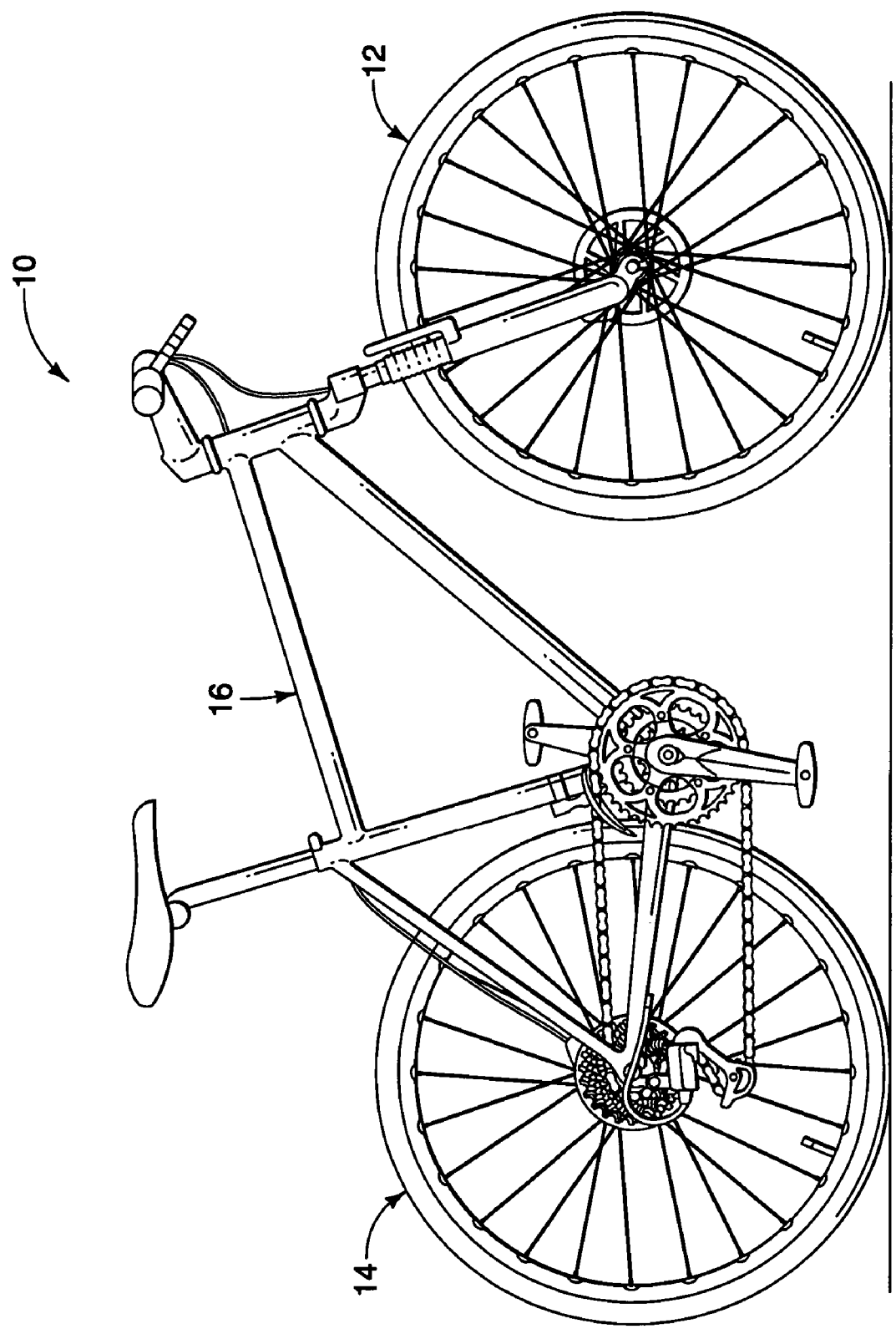
FIG. 1 is a side elevational view of a front bicycle wheel with a bicycle hub in accordance with a first preferred embodiment of the present invention.

Referring initially to FIG. 1, a bicycle 10 is illustrated with a front bicycle wheel 12 and a rear bicycle wheel 14 in accordance with a first embodiment of the present invention. The bicycle wheels 12 and 14 are attached to a bicycle frame 16 in a conventional manner. Since the parts of the bicycle 10 are well known in the art, the parts of the bicycle 10 will not be discussed or illustrated in detail herein, except for the parts that relate to the present invention. In other words, only the parts related to the bicycle wheels 12 and 14 will be discussed and illustrated in detail herein. Moreover, various conventional bicycle parts such as brakes, additional sprockets, derailleurs, etc., which may or may not be illustrated herein, can be used in conjunction with the present invention.

Generally, the present invention is applied in the same manner to both of the bicycle wheels 12 and 14. The only significant difference between the front bicycle wheel 12 and the rear bicycle wheel 14 is that the rear bicycle wheel 14 has a hub with a freewheel to support a plurality of sprockets and rim dished to the opposite side from the front bicycle wheel 12. Thus, only the front bicycle wheel 12 will be discussed and illustrated in detail herein.

Figure 2:
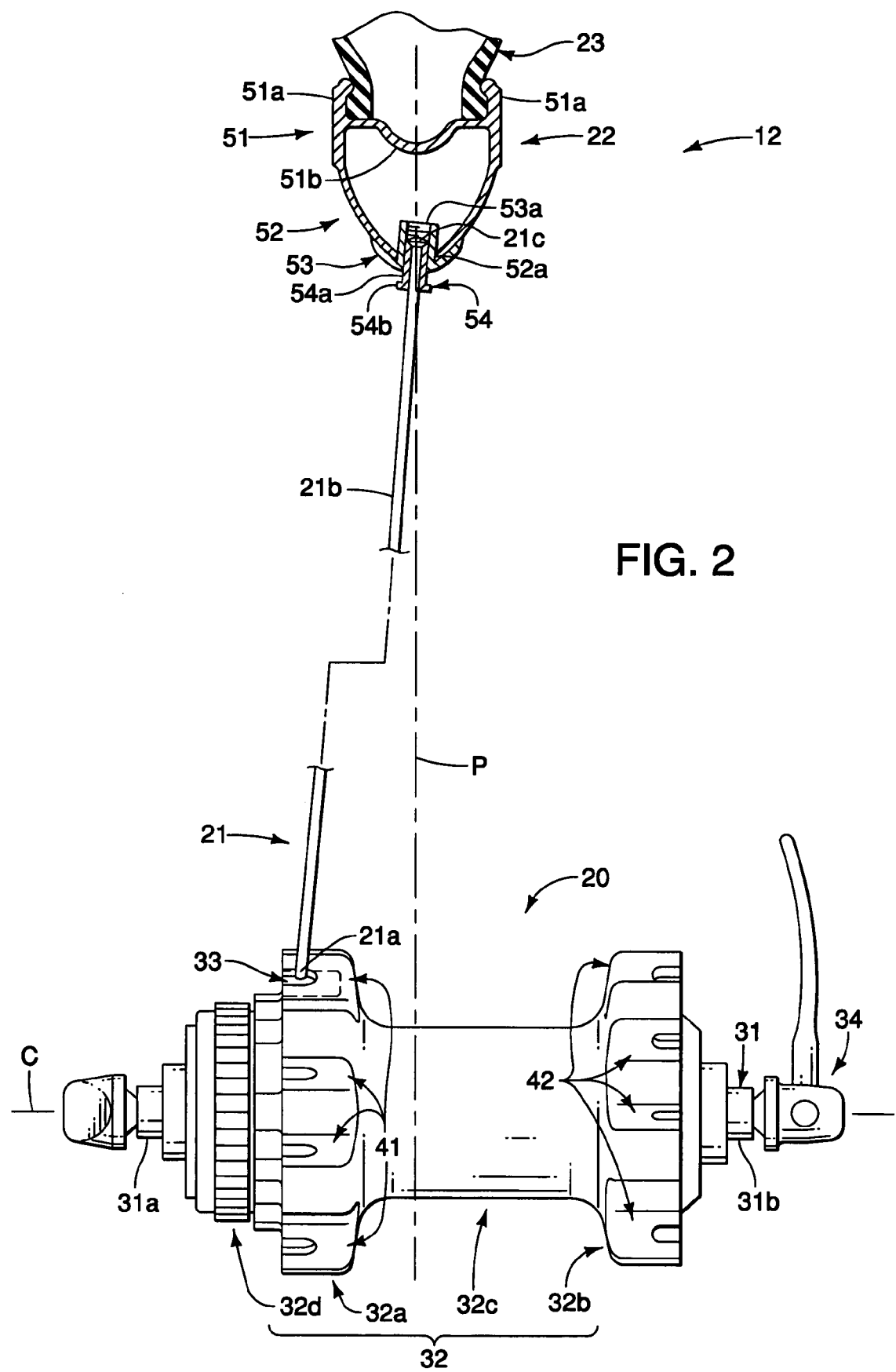
FIG. 2 is a partial rear side view of the front wheel illustrated in FIG. 1 with the bicycle hub shown in elevation and the rim shown in cross section.
Figure 3:
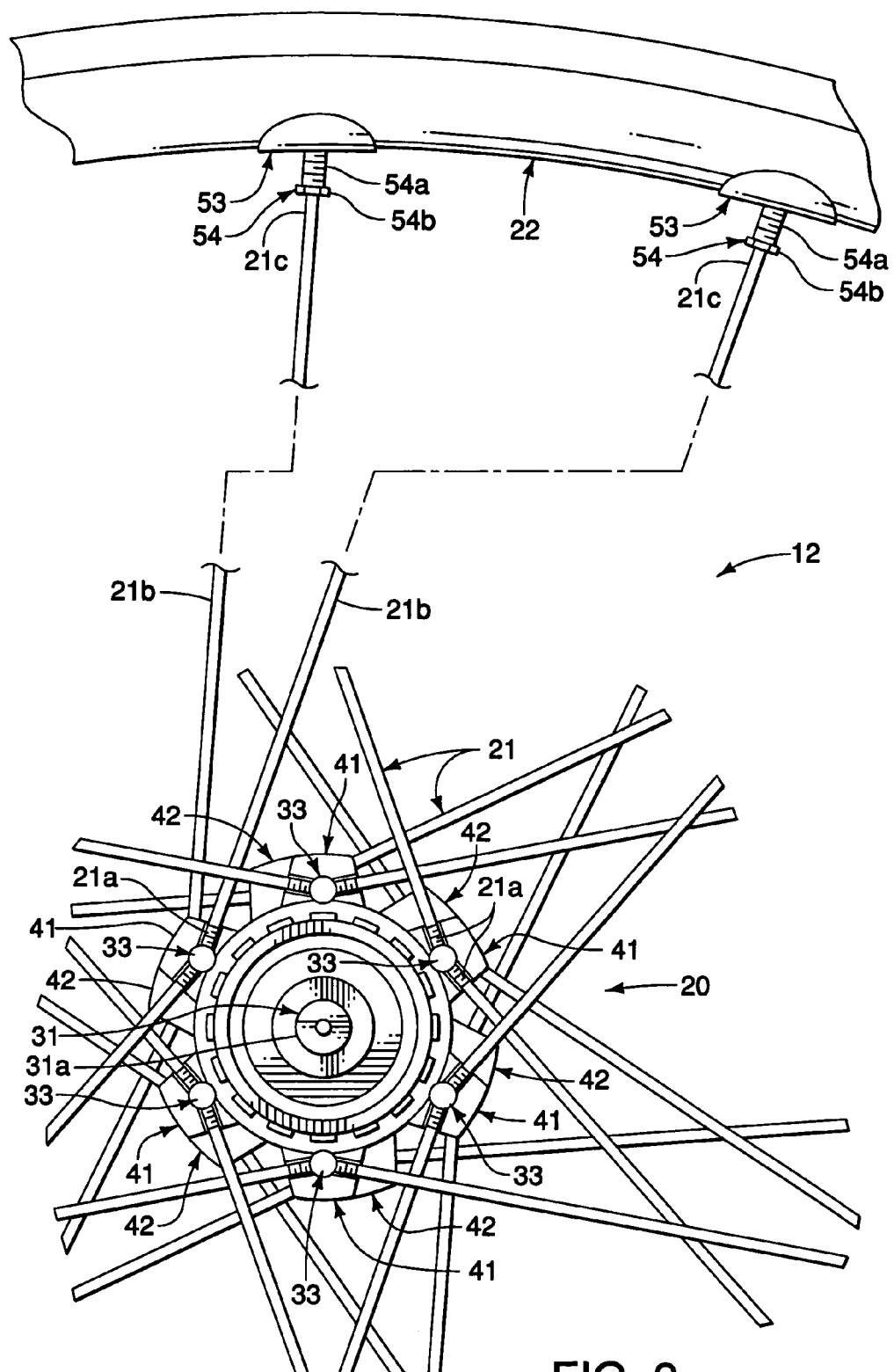
FIG. 3 is a partial side elevational view of the front wheel illustrated in FIGS. 1 and 2.
Figure 4:
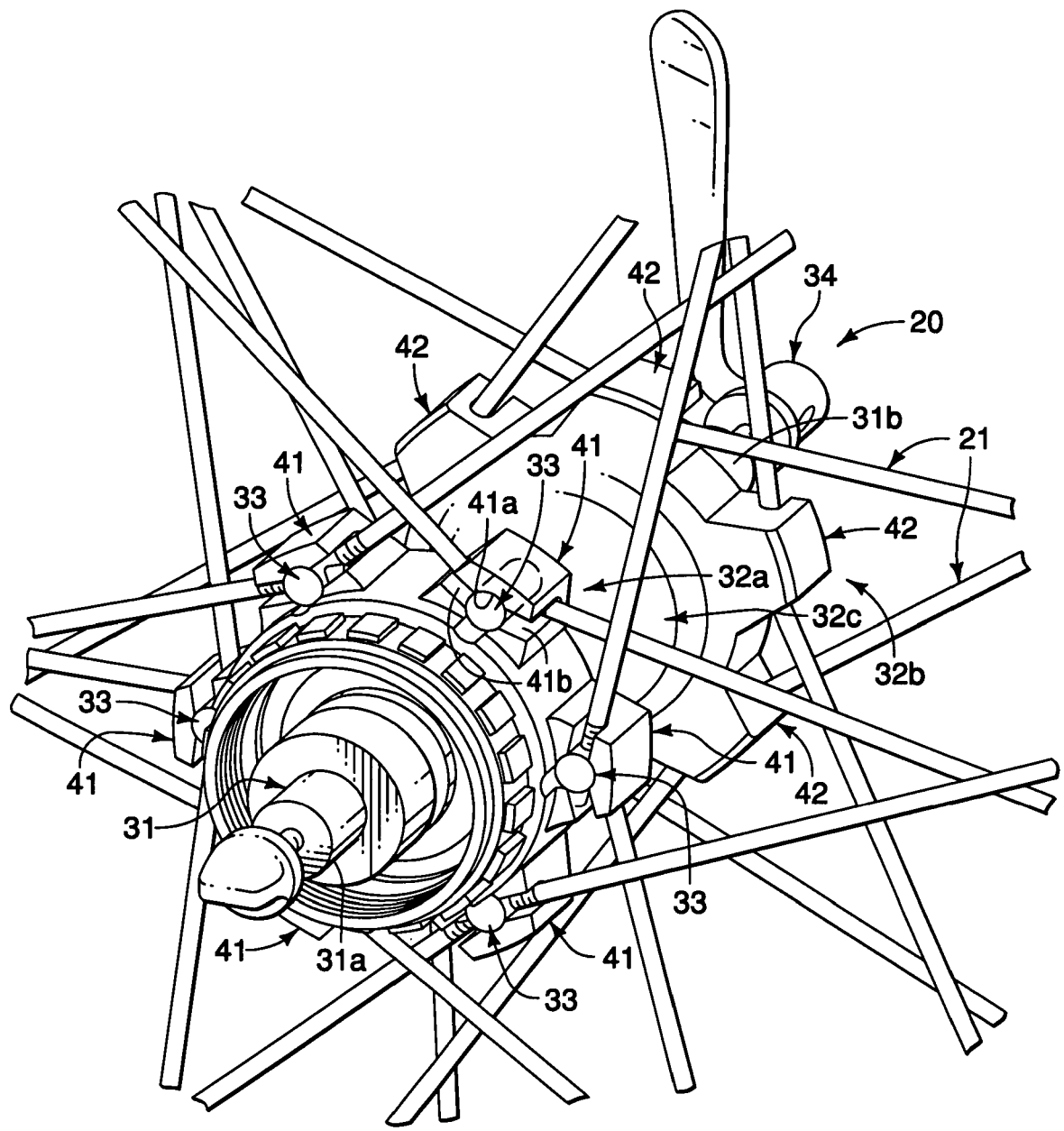
FIG. 4 is an enlarged partial perspective view of the bicycle hub and spokes of the front wheel illustrated in FIGS. 1-3.

Referring now to FIGS. 2 and 3, the bicycle wheel 12 basically includes a center hub 20, a plurality of spokes 21, and an annular rim 22 with a pneumatic tire 23. The spokes 21 are tension spokes that interconnect the hub 20 and the rim 22 together as explained below. The tire 23 can include a tire and tube type, or can be a tubeless tire type, as needed and/or desired.

In the illustrated embodiment, the bicycle wheel 12 includes twenty-four of the spokes 21 that extend generally tangentially from the hub 20 to the rim 22. Also, in the illustrated embodiment, the spokes 21 are coupled to the rim 22 at equally spaced circumferential locations as seen in FIG. 1. Of course, it will be apparent to those skilled in the art from this disclosure that bicycle wheel 12 could use a modified rim and/or hub in order to accommodate different spoking arrangements without departing from the scope of the present invention. Moreover, it will be apparent to those skilled in the art from this disclosure that the bicycle wheel 12 could use a modified rim and/or hub in order to accommodate fewer or more spokes 21 if needed and/or desired. In any case, the spokes 21 are preferably coupled to the annular rim 22 in circumferentially spaced arrangement.

Figure 5:
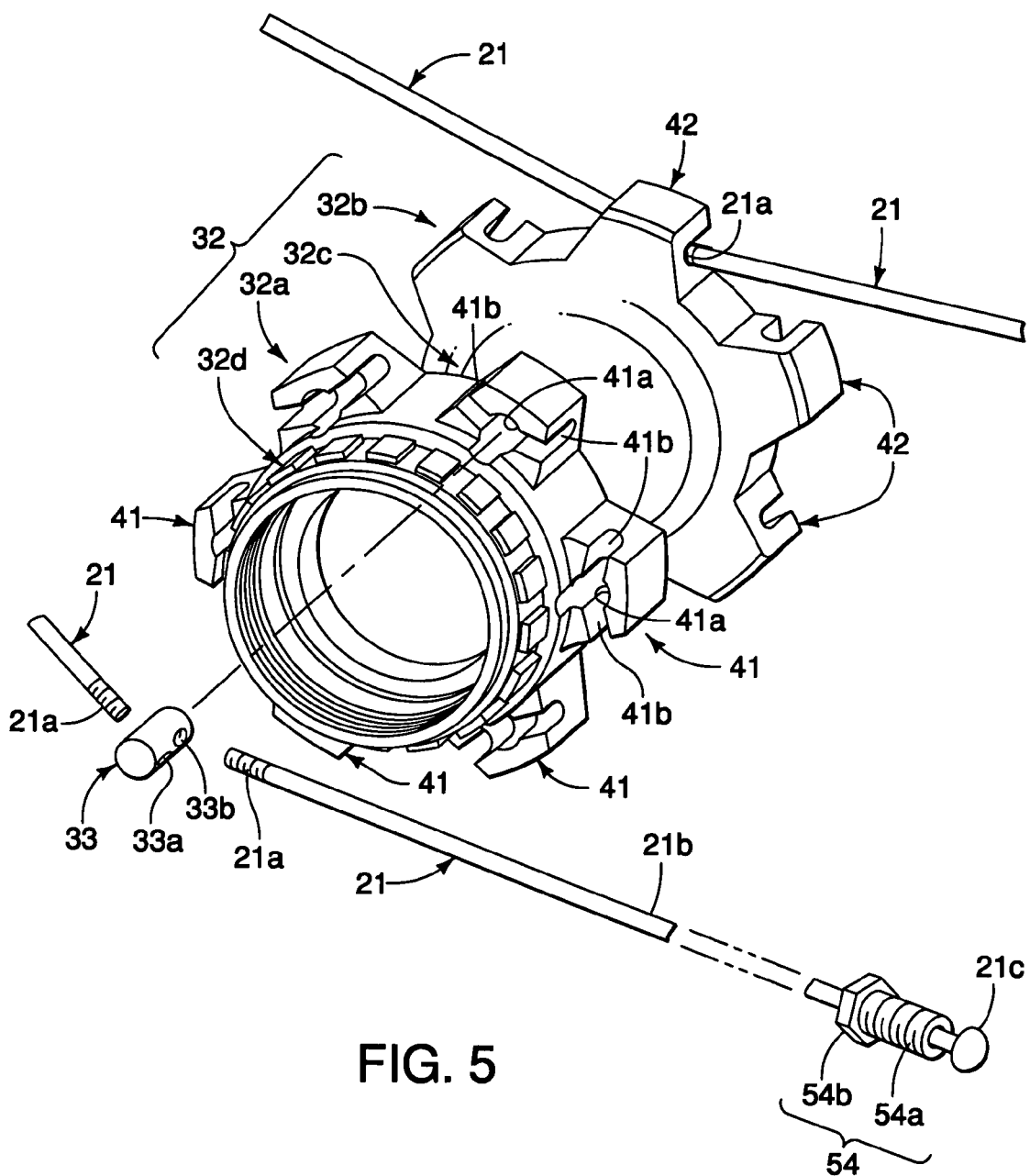
FIG. 5 is an exploded partial perspective view of the bicycle hub and some of the spokes of the front wheel illustrated in FIGS. 1-4.

Referring now to FIGS. 2 and 5, the spokes 21 will now be discussed in more detail. The spokes 21 are preferably straight spokes that are identical to each other. Each of the spokes 21 basically includes a threaded inner end portion 21a, a straight center or a middle portion 21b and an outer end or head portion 21c. The portions 21a, 21b and 21c of each of the spokes 21 are preferably integrally formed together as a one piece, unitary member. The threaded inner end portions 21a of the spokes 16 are coupled to the hub 20, while the outer end portions 21c of the spokes 21 are coupled to the rim 22, as explained below. The spokes 21 are preferably wire-type spokes that are relatively conventional. Thus, the spokes 21 will not be discussed and/or illustrated in detail herein, except as related to the hub 20 of the present invention.

Referring to FIGS. 2-5, the hub 20 will now be discussed in more detail. The hub 20 basically includes an axle 31 with a hub shell or body 32 disposed about the axle 31 in a rotatable manner by a pair of bearings in a conventional manner. The hub 20 further includes a plurality of spoke fixing elements 33 for securing the spokes The parts of the hub 20, other than the hub shell or body 32 and the spoke fixing elements 33, are relatively conventional. Thus, these parts of the hub 20 will not be discussed or illustrated in detail herein.

The axle 31 is a hard rigid member that has a pair of opposite free ends 31a and 31b extending outwardly from the hub shell 32. The free ends 31a and 31b of the axle 31 are fixedly coupled the frame 16 via a quick release device 34 in a conventional manner. The axle 31 has a center axis C that defines the center axis of the wheel 12.

The hub shell 32 is a hard rigid tubular member that is rotatably supported on the axle 31. The hub shell 32 includes a first spoke mounting portion 32a, a second spoke mounting portion 32b and a tubular center portion 32c disposed between the mounting portions 32a and 32b. Thus, the spoke mounting portions 32a and 32b are disposed at opposite ends of the hub shell 32. The spoke mounting portions 32a and 32b are configured and arranged to fixedly secure the spokes 21 thereto. The spoke mounting portions 32a and 32b are preferably mirror images of each other as shown, except that the spoke mounting portion 32a is circumferentially offset from the spoke mounting portion 32b, as explained below. Of course, the spoke mounting portions 32a and 32b do not need to be mirror images of each other if needed and/or desired.

Optionally, the hub shell 32 is also provided with a brake mounting portion 32d for attaching a disc brake rotor (not shown). The optional disc brake rotor (not shown) can be attached to the hub shell 32 by a retaining or locking ring that is threaded into on the end of the hub shell 32 such as disclosed in U.S. Pat. No. 6,371,252 to Kanehisa (Assigned to Shimano, Inc.).

The spoke mounting portion 32a includes a plurality (six) of individual spoke fixing portions or protrusions 41 that extend outwardly in a radial manner from one end of the hub shell 32. The spoke fixing protrusions 41 are equally spaced apart in a circumferential direction around the main body of the spoke mounting portion 32a. Each of the spoke fixing protrusions 41 is configured and arranged to fix a pair of the spokes 21 thereto using one of the spoke fixing elements 33. Each of the spoke fixing protrusions 41 is preferably identical as shown. Of course, the spoke fixing protrusions 41 do not need to be identical if needed and/or desired.

Likewise, the mounting portion 32b includes a plurality (six) of individual spoke fixing portions or protrusions 42 that extend outwardly in a radial manner from one end of the hub shell 32. The spoke fixing protrusions 42 are equally spaced apart in a circumferential direction around the main body of the spoke mounting portion 32b. The spoke fixing protrusions 42 are preferably offset mirror images of the spoke fixing protrusions 41. In other words, the spoke fixing protrusions 42 are circumferentially offset from the spoke fixing protrusions 41 by an acute angle such as 15° and face in the opposite axial direction from the spoke fixing protrusions 41 as seen in FIG. 3.

Each of the spoke fixing protrusions 42 is configured and arranged to fix a pair of the spokes 21 thereto using one of the spoke fixing elements 33. Each of the spoke fixing protrusions 42 is preferably identical as shown. Of course, the spoke fixing protrusions 42 do not need to be identical if needed and/or desired.

Thus, the fixing portions or protrusions 41 and 42 of the hub shell 32 are individual radial projections that are circumferentially spaced apart about opposite ends of the hub shell 32. Since the fixing protrusions 41 and 42 are identically configured and dimensioned, except for orientation, only the fixing protrusions 41 on the spoke mounting portion 32a of hub shell 32 will be discussed and/or illustrated in detail.

Each of the spoke fixing protrusions 41 of the hub shell 32 has an axially facing surface with an insertion opening 41a that is dimensioned to receive one of the fixing elements 33, and a pair of circumferentially facing surfaces with a spoke guide opening or slot 41b. The spoke guide openings 41b extend from the circumferentially facing surfaces to the insertion opening 41a of the corresponding one of the spoke fixing protrusions 41. More specifically, the spoke guide openings 41b have center axes that extend outwardly at an obtuse angle (e.g., 159°) from the insertion opening 41a. In this embodiment, each of the spoke guide openings 41b extends in an axial direction along the circumferentially facing surfaces relative to the hub shell 32 such that the spoke guide openings 41b and the insertion opening 41a meet at the axially facing surface of the spoke fixing protrusion 41. In other words, in this embodiment, each of the spoke guide openings 41b is a slot that extends to a corresponding one of the axially facing surfaces of a corresponding one of the spoke fixing protrusions 41. This arrangement of the spoke guide openings 41b and the insertion opening 41 a allows a pair of the spokes 21 and one of the fixing elements 33 to be inserted into the spoke guide openings 41b and the insertion opening 41a, respectively, in the assembled condition.

Figure 6:
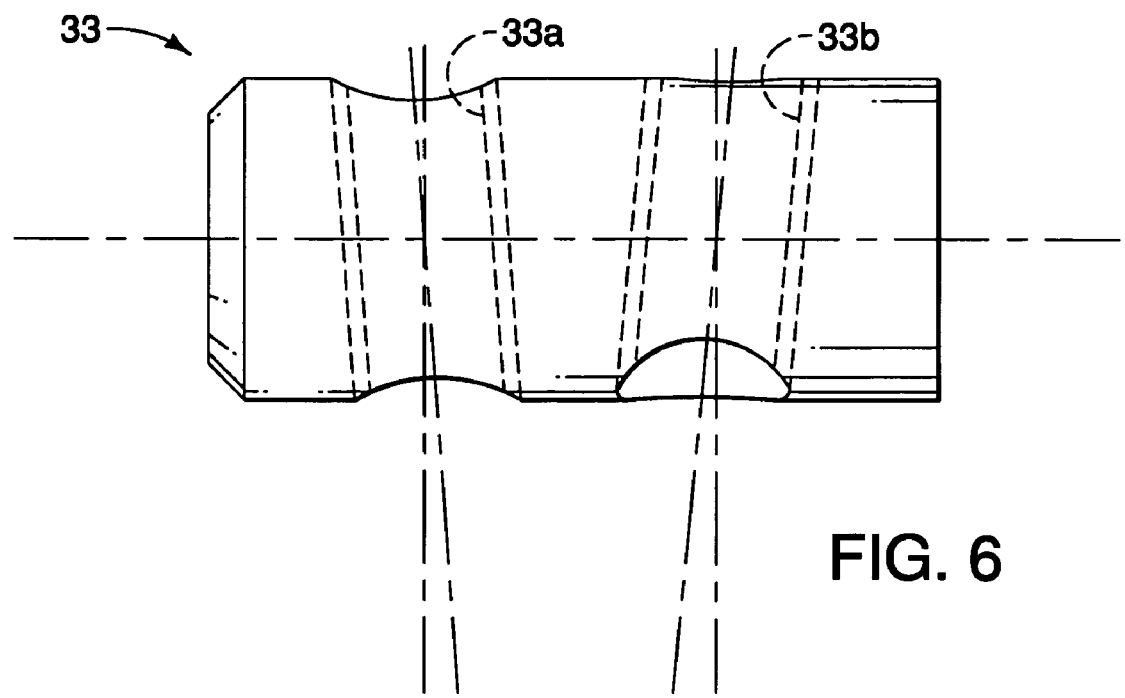
FIG. 6 is a side elevational view of one of the fixing elements for attaching a pair of spokes to the bicycle hub of the front wheel illustrated in FIGS. 1-5.
Figure 7:
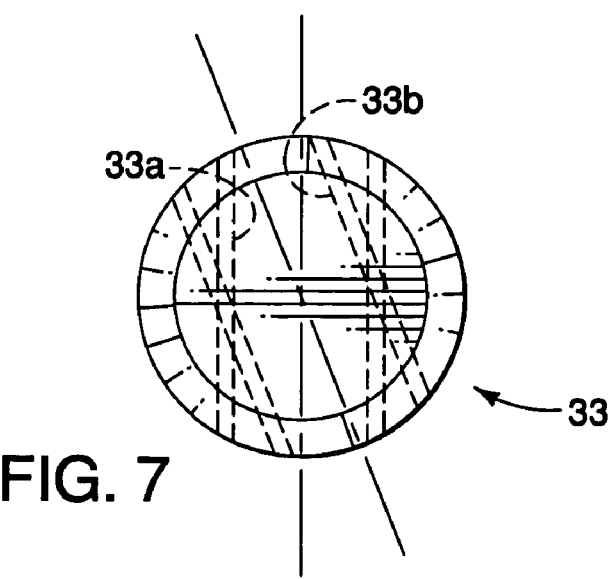
FIG. 7 is an axial end elevational view of the fixing element illustrated in FIG. 6 for attaching a pair of spokes to the bicycle hub of the front wheel illustrated in FIGS. 1-5.
Figure 8:
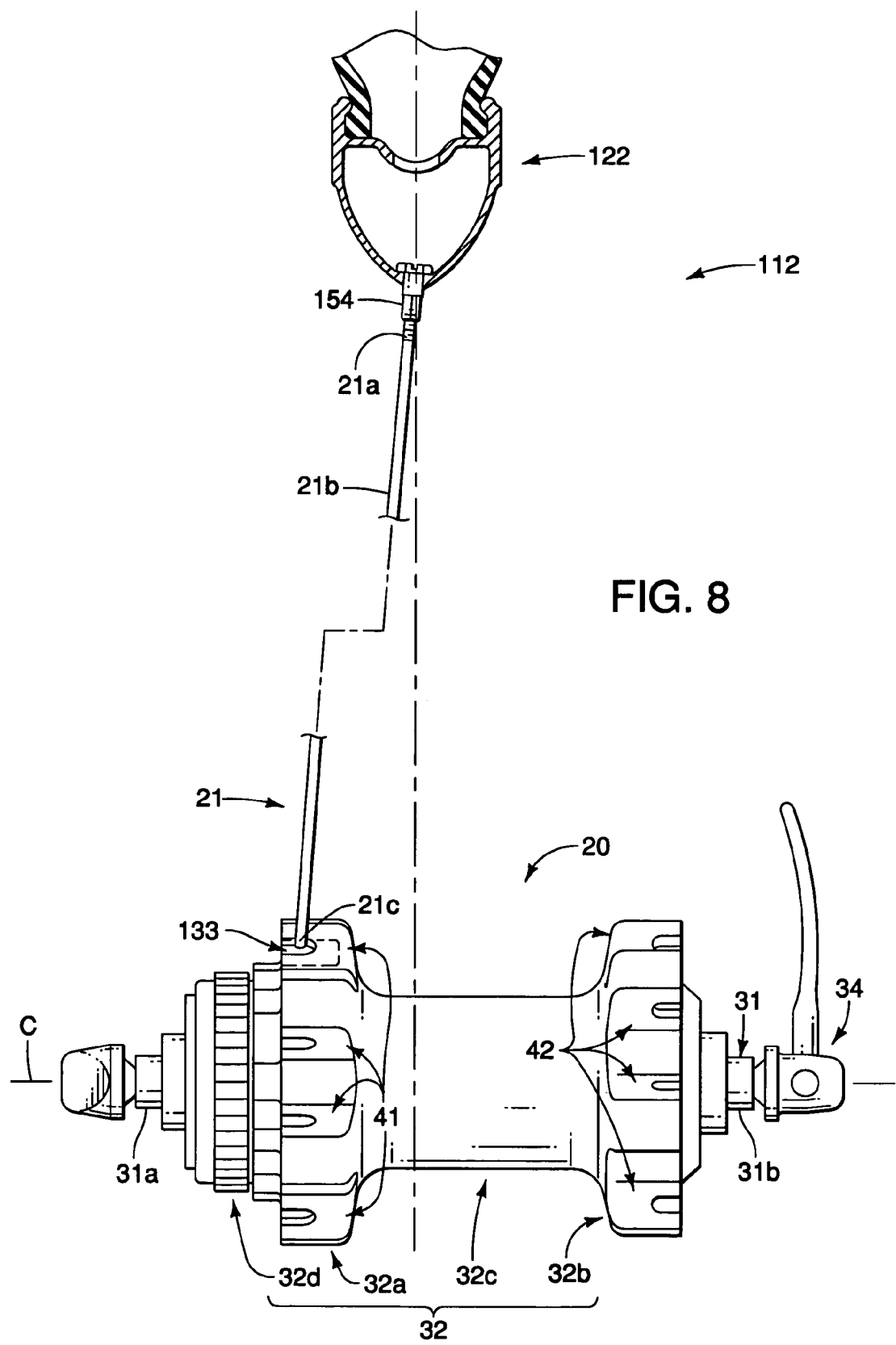
FIG. 8 is a partial rear side view of a front wheel in accordance with a second preferred embodiment of the present invention, with the bicycle hub shown in elevation and the rim shown in cross section.
Figure 9:
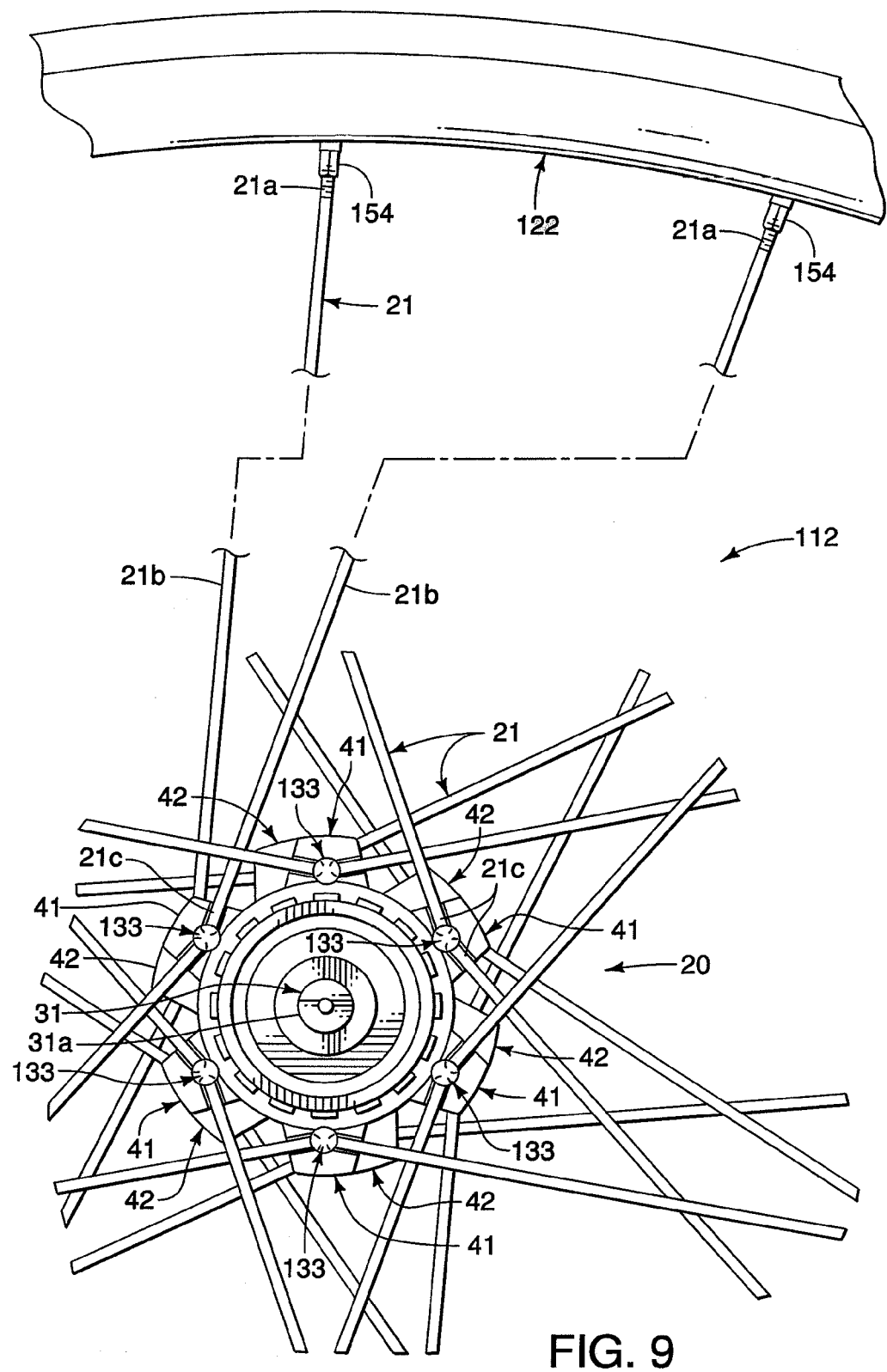
FIG. 9 is a partial side elevational view of the front wheel illustrated in FIG. 8 in accordance with the second embodiment of the present invention.
Figure 10:
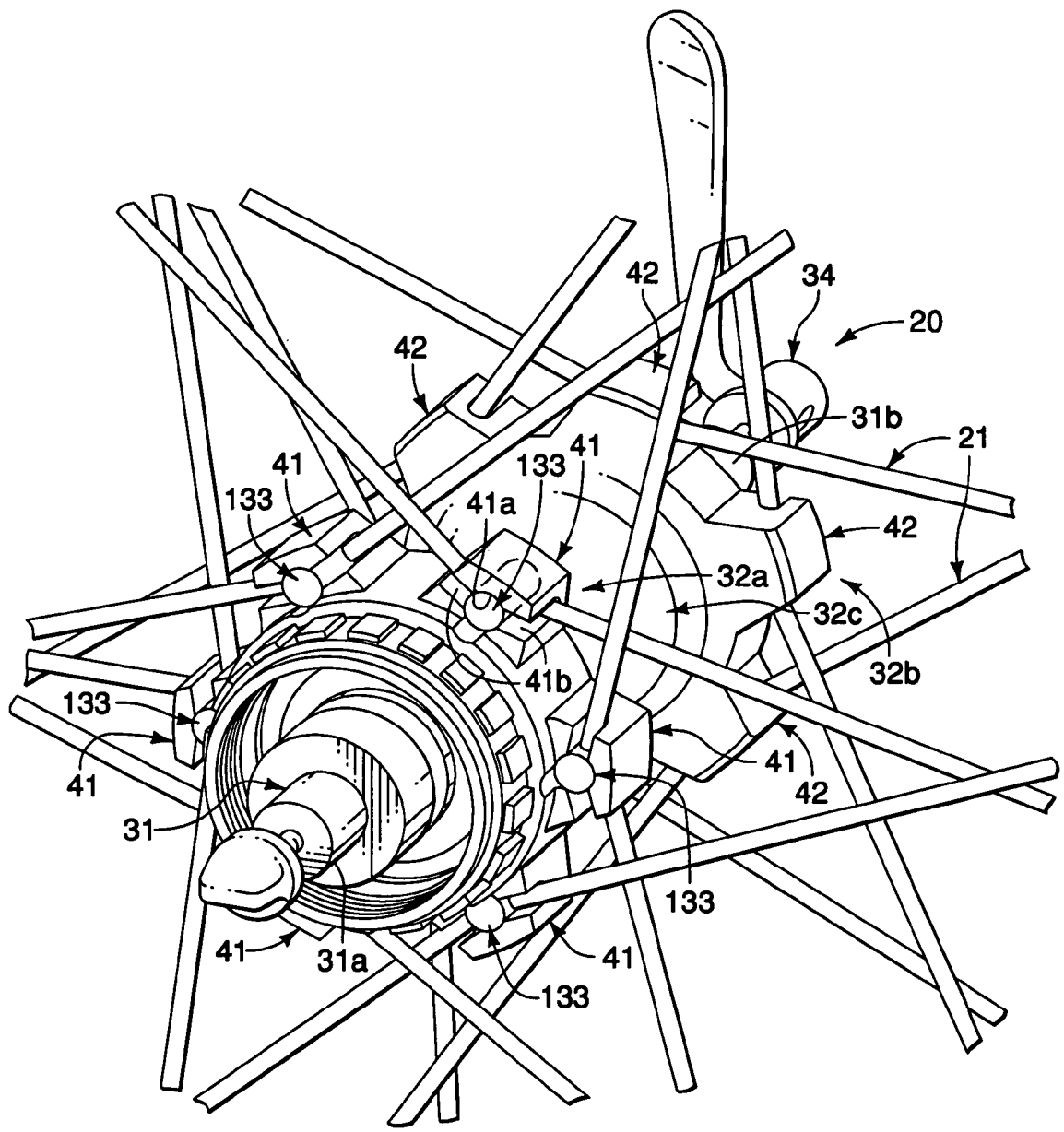
FIG. 10 is an enlarged partial perspective view of the bicycle hub and spokes of the front wheel illustrated in FIGS. 8 and 9 in accordance with the second embodiment of the present invention.
Figure 11:
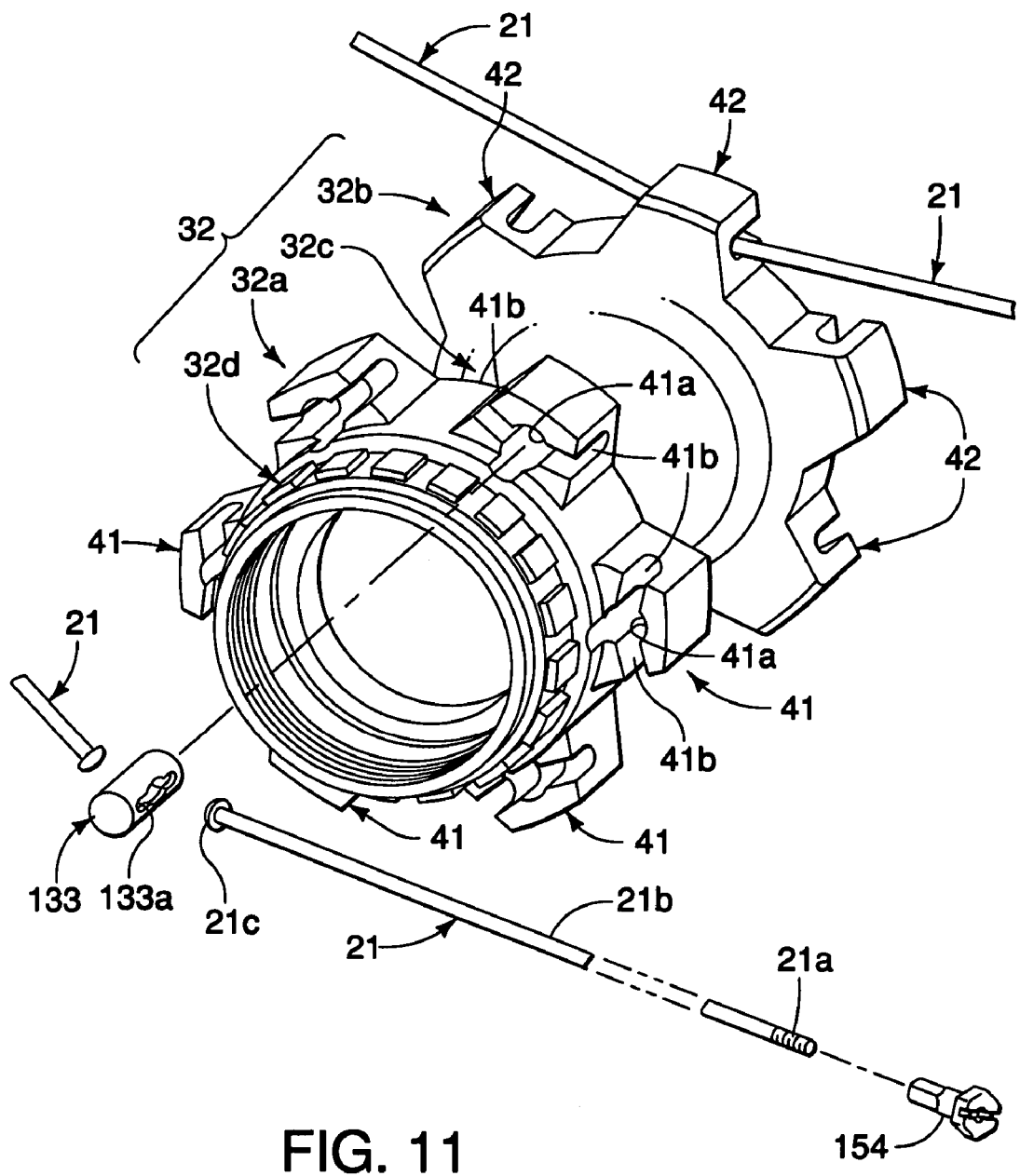
FIG. 11 is an exploded partial perspective view of the bicycle hub and some of the spokes of the front wheel illustrated in FIGS. 8-10 in accordance with the second preferred embodiment of the present invention.
Figure 12:
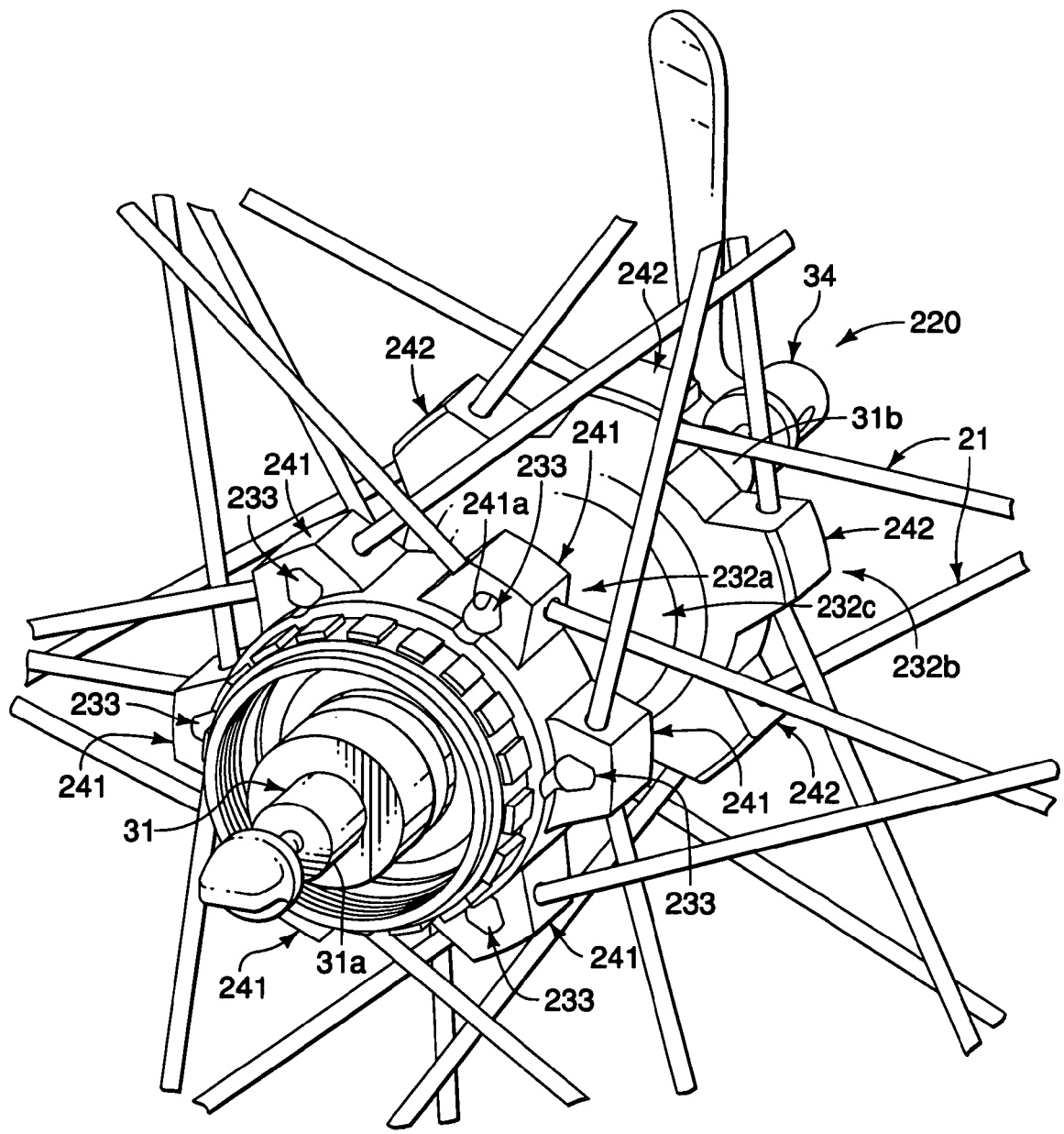
FIG. 12 is a partial side elevational view of a front wheel in accordance with a third embodiment of the present invention.
Figure 13:
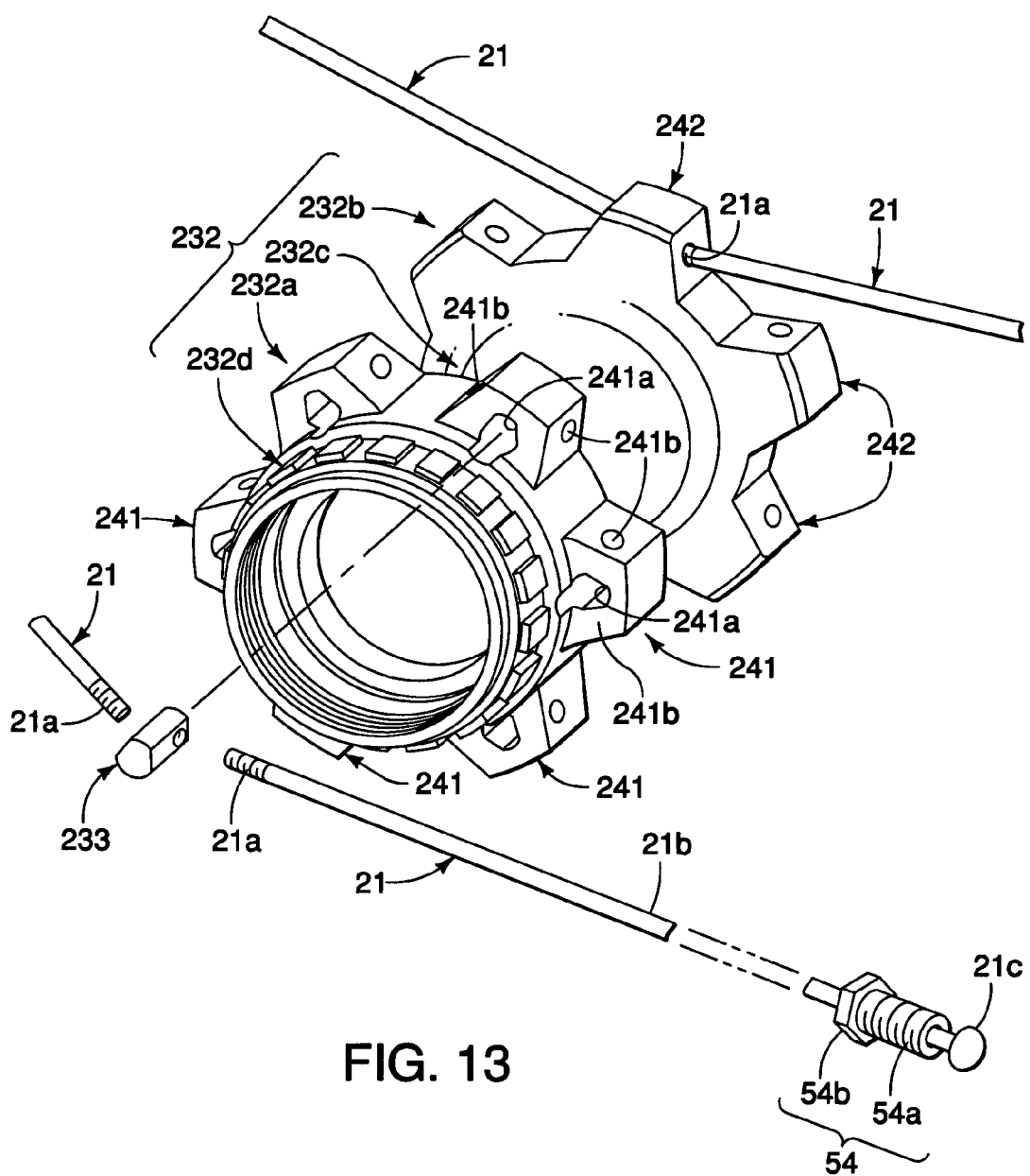
FIG. 13 is an enlarged partial perspective view of the bicycle hub and spokes of the front wheel illustrated in FIG. 12 in accordance with the third embodiment of the present invention.
Figure 14:
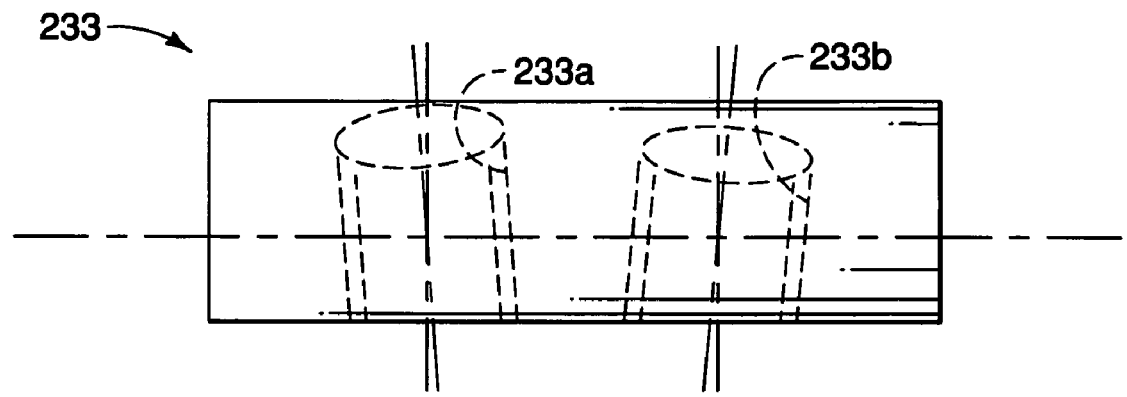
FIG. 14 is a side elevational view of one of the fixing elements for attaching two spokes to the bicycle hub illustrated in FIGS. 12 and 13.
Figure 15:
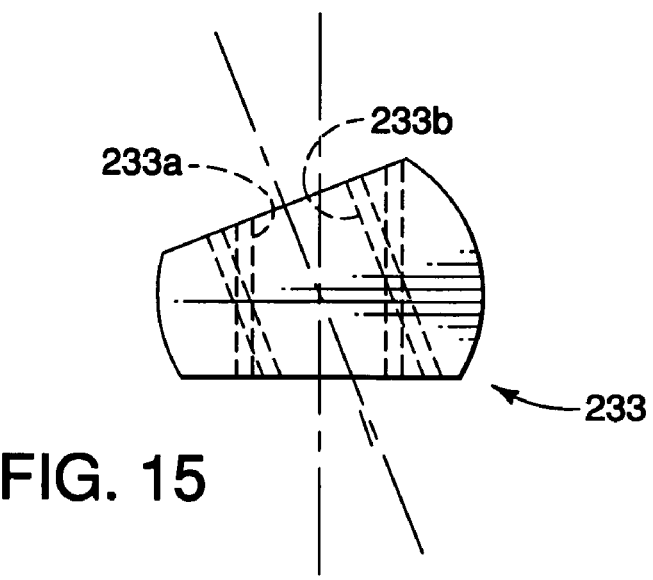
FIG. 15 is an axial end elevational view of the fixing element illustrated in FIG. 14 for attaching two spokes to the bicycle hub illustrated in FIGS. 12 and 13.
Figure 16:
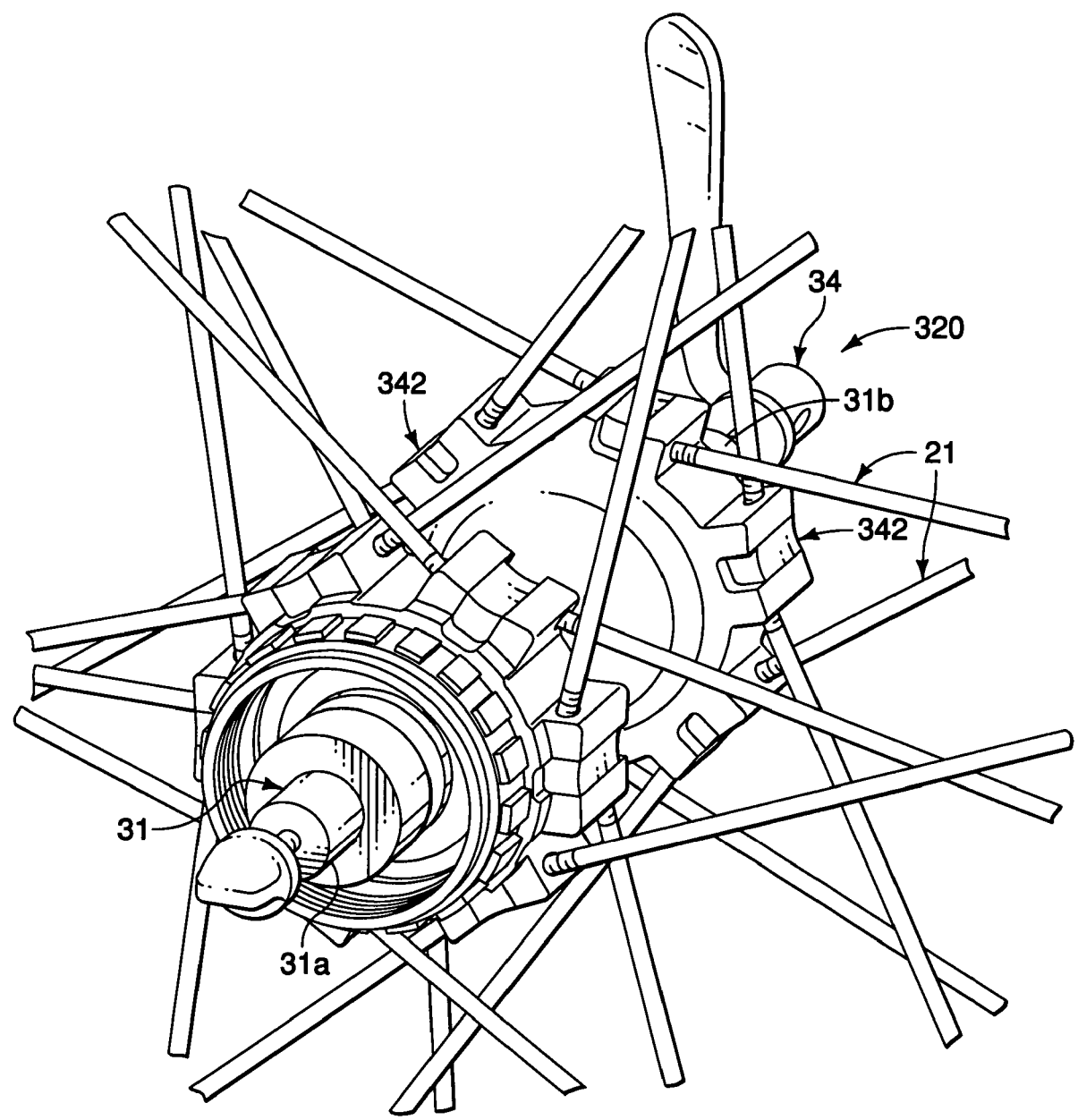
FIG. 16 is an enlarged partial perspective view of a bicycle hub and spokes of a front wheel in accordance with a fourth embodiment of the present invention.

As seen in FIG. 5, the fixing elements 33 are removably coupled to the fixing protrusions 41 and 42 of the hub shell 32. In particular, the fixing elements 33 are dimensioned to be inserted axially into the insertion openings 41*a* of the fixing protrusions 41 with a pair of the spokes 21 coupled thereto. As best seen in FIGS. 6 and 7, each of the fixing elements 33 has a pair of threaded spoke attachment openings or bores 33*a* and 33*b* to attach a pair of the threaded inner end portion 21*a* of a pair of the spokes 21 to the hub shell 32. In this embodiment, each of the threaded openings or bores 33*a* and 33*b* forms a spoke attachment structure of the fixing element 33 that is configured and arranged to threadedly receive one of the threaded inner end portion 21*a* of one of the spokes 21. The threaded bores 33*a* and 33*b* (spoke attachment structures) of each of the fixing elements 33 are arranged so that the spokes 21 from each of the fixing elements 33 extend outwardly at an obtuse angle (e.g., 159°). In other words, the center axes of the threaded bores 33*a* and 33*b* extend outwardly from each of the fixing elements 33 at an obtuse angle (e.g., 159°). In addition, the center axes of the threaded bores 33*a* and 33*b* are angled with respect to a plane that extends perpendicular to the center longitudinal axis of the fixing element 33. In particular, the threaded bores 33*a* forms an angle of about 4° with respect to a plane that extends perpendicular to the center longitudinal axis of the fixing element 33, while the threaded bores 33*b* forms an angle of about 5° with respect to a plane that extends perpendicular to the center longitudinal axis of the fixing element 33. The different angles of the center axes of the threaded bores 33*a* and 33*b* avoids interference between crossing pairs of the spokes 21.

Turning now to the description of the rim 22 as seen in FIGS. 1-3, the rim 22 is an annular member designed for rotation about the center axis C of the hub axle 31. The rim 22 is constructed of a substantially rigid material, such as those materials, which are well known in the art. For example, the rim 22 can be constructed of any suitable metallic material, such as plated steel, stainless steel, aluminum, magnesium or titanium, as well as other non-metallic materials, such as a carbon fiber composite. Preferably, the rim 22 is constructed of aluminum. The construction of the rim 22 will now be discussed in more detail below.

The rim 22 is substantially circular as seen in side elevation (FIG. 1). Basically, the rim 22 has a uniform cross-sectional profile as seen in FIG. 2, except for the absence of material for accommodating an air filling valve. The rim 22 basically includes an outer annular tire engaging portion 51 and an inner annular spoke attachment portion 52 that is integrally formed with the tire engaging portion 51. The rim 22 also includes a plurality of reinforcement members 53 fixedly coupled to the spoke attachment portion 52 at a plurality of attachment openings 52*a*. Basically, the tire engaging portion 51 and the spoke attachment portion 52 of the rim 22 have a uniform cross-sectional profile as seen in FIG. 2, except for the absence of material for accommodating an air filling valve and attachment openings 52*a* for accommodating the reinforcement members 53.

The tire engaging portion 51 is a U-shaped portion in cross section that includes a pair of annular side sections 51*a* and an annular outer bridge or connecting section 51*b*. The spoke attachment portion 52 is a U-shaped portion in cross section that extends downwardly from the tire engaging portion 51 to form a hollow interior therebetween. The annular side sections 51*a* form a pair of annular tire supporting surfaces and a pair of annular braking surfaces in a conventional manner. The tire supporting surfaces are opposed annular surfaces that face each other toward the center plane P. The tire supporting surfaces have annular ribs formed at their free ends to retain beads of the tire 23 in a conventional manner. The annular braking surfaces face outwardly away from the center plane P to engage conventional rim brakes.

The spoke attachment portion 52 preferably has twenty-four of the attachment openings 52*a* in order to attach a total of twenty-four spokes 21. Preferably, the attachment openings 52*a* are circumferentially equally spaced apart in the circumferential direction from each other as best understood from FIG. 1. Alternating ones of the attachment openings 52*a* are preferably slightly angled in opposite axial directions relative to the center plane P so that the spokes 21 coupled thereto extend to opposite ends of the hub 20. Preferably, the spokes 21 are coupled between the hub 20 and the rim 22 so that the wheel 12 is dished, i.e., the rim 22 is off set from the center of the hub 22 towards the end of the hub shell 32 that has the brake mounting portion 32*d*. Each of the attachment openings 52*a* is configured to receive a tubular part of one of the reinforcement members 53 therein.

The tire engaging portion 51 and the spoke attachment portion 52 are preferably integrally formed together as a one-piece unitary aluminum member to form a constant cross-sectional shape about the entire circumference of the rim 22. For example, the rim 22 can be constructed by extruding a length of aluminum with the cross-sectional shape illustrated in FIG. 2. Then, the extruded length of aluminum is bent into a circular shape, with the ends of the extruded length of aluminum being welded together. The attachment openings can be punched or drilled in a conventional manner before or after welding the free ends of the length of aluminum together. Finally, the reinforcement members 53 are bonded to the spoke attachment portion 52 of the rim 22 by welding, brazing, adhesive or the like.

The reinforcement members 53 are preferably formed as separate aluminum members from the spoke attachment portion 52 of the rim 22 by casting, machining and/or any other suitable manufacturing technique. The reinforcement members 53 are fixedly coupled to the spoke attachment portion 52 of the rim 22 in order to reinforce the rim 22.

The reinforcement members 53 will now be discussed in more detail. As mentioned above, the reinforcement members 53 are preferably identical members that are welded to the exterior surface of the spoke attachment portion 52 in order to permanently secure the reinforcement members 53 thereto. Each reinforcement member 53 is preferably constructed as a one-piece unitary member from a lightweight, rigid metallic material. Specifically, each reinforcement member 53 is preferably constructed of aluminum, as mentioned above. In any case, the reinforcement members 53 are preferably constructed of the same material as the spoke attachment portion 52, and are permanently bonded thereto to reinforce the rim 22. The reinforcement members 53 effectively increase the thickness of the spoke attachment portion 52 at the attachment openings 52*a* to provide rigid reinforcement to the rim 22.

In this embodiment, each of the reinforcement members 53 has a substantially inverted mushroom shape as best shown in FIG. 2. Specifically, each of the reinforcement members 53 has a threaded opening 53*a* in order to threadedly couple one of the spokes 21 thereto by an adapter 54. The adapters 54 are tubes with external threads 54*a* and a non circular (e.g., rectangularly shaped, hexagonally shaped, longitudinally splined, etc) tool engaging portion 54*b*. The adapters 54 are mounted on the shafts of the spokes 21 such that one end of the adapter 54 engages the head portion 21*c* of one of the spokes 21. The external threads 54*a* of the adapters 54 are configured to mate with the internal threads 53a of the reinforcement members 53. Thus, the spokes 21 can be adjustably, releasably and fixedly coupled to the rim 22 via the adapters 54.

Second Embodiment

Referring now to FIGS. 8-11, a portion of a modified front wheel 112 is illustrated in accordance with a second preferred embodiment. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity. In other words, unless otherwise specified, the configuration of the front wheel of the second embodiment is the same as the configuration of the first embodiment.

The bicycle wheel 112 basically includes the center hub 20 of the first embodiment, a plurality of the spokes 21, and an annular rim 122 with the pneumatic tire 23. In this embodiment, the hub 20 uses modified spoke fixing elements 133 such that the head portions 21c of the spokes 21 engage the spoke fixing elements 133 and the threaded portions 21a of the spokes 21 are attached to the rim 122 via conventional spoke nipples 154 or the like. Thus, in this embodiment, the rim 122 is identical to rim 22, except for the elimination of the reinforcement members 53 and the modifications to accommodate the spoke nipples 154.

Similar to the first embodiment, the fixing elements 133 are removably coupled to the fixing protrusions 41 and 42 of the hub shell 32. In particular, the fixing elements 133 are dimensioned to be inserted axially into the insertion openings 41a of the fixing protrusions 41 with a pair of the spokes 21 coupled thereto. Each of the fixing elements 133 has a pair of identically shaped spoke attachment openings or retaining slots 133a to attach a pair of the head portions 21c of a pair of the spokes 21 to the hub shell 32. In this embodiment, each of the spoke attachment openings or retaining slots 133a forms a spoke attachment structure of the fixing element 133 that is configured and arranged to receive one of the head portions 21c of one of the spokes 21. Each of the retaining slots 133a (spoke attachment structures) has a center enlarged opening section and a pair of reduced width sections. The center enlarged opening section of the retaining slots 133a are dimensioned so that the head portions 21c of the spokes 21 can be easily inserted into the retaining slots 133a. The reduced width sections of the retaining slots 133a are dimensioned so that the head portions 21c of the spokes 21 are retained in the retaining slots 133a. Thus, after the head portions 21c of the spokes 21 are inserted into the center enlarged opening section of the retaining slots 133a, the head portions 21c of the spokes 21 are slid into one of the reduced width sections of the retaining slots 133a to retain the head portions 21c of the spokes 21 in the retaining slots 133a.

Similar to the first embodiment, the spoke attachment openings or retaining slots 133a (spoke attachment structures) of each of the fixing elements 133 are arranged so that the spokes 21 from each of the fixing elements 133 extend outwardly at an obtuse angle (e.g., 159°). In other words, the center axes of the reduced width sections of the retaining slots 133a extend outwardly from each of the fixing elements 133 at an obtuse angle (e.g., 159°).

Third Embodiment

Referring now to FIGS. 12-15, a modified front hub 220 is illustrated in accordance with a third preferred embodiment. In view of the similarity between the third embodiment and the prior embodiments, the parts of the third embodiment that are identical to the parts of the prior embodiments will be given the same reference numerals as the parts of the prior embodiments. Moreover, the descriptions of the parts of the third embodiment that are identical to the parts of the prior embodiments may be omitted for the sake of brevity. In other words, unless otherwise specified, the configuration of the front wheel of the third embodiment is the same as the configuration of the first embodiment.

In this embodiment, the hub 220 is identical to the hub 20 of the first embodiment, except that a modified hub shell 232 is used that has a plurality of modified spoke fixing elements 233. This embodiment uses the spokes 21 and the rim 22 of the first embodiment. In particular, the hub shell 232 is identical to the hub shell 32, except that the hub shell 232 includes a pair of modified spoke mounting portions 232a and 232b arranged at opposite ends of a tubular center portion 232c (identical to portion 32c). The remainder of the hub shell 232 is identical to the hub shell 32 as discussed above.

The spoke mounting portion 232a includes a plurality (six) of individual spoke fixing portions or protrusions 241 that extend outwardly in a radial manner from one end of the hub shell 232. The spoke fixing protrusions 241 are equally spaced apart in a circumferential direction around the main body of the spoke mounting portion 232a. Each of the spoke fixing protrusions 241 is configured and arranged to fix a pair of the spokes 21 thereto using one of the spoke fixing elements 233. Each of the spoke fixing protrusions 241 is preferably identical as shown. Of course, the spoke fixing protrusions 241 do not need to be identical if needed and/or desired.

Likewise, the mounting portion 232b includes a plurality (six) of individual spoke fixing portions or protrusions 242 that extend outwardly in a radial manner from one end of the hub shell 232. The spoke fixing protrusions 242 are equally spaced apart in a circumferential direction around the main body of the spoke mounting portion 232b. The spoke fixing protrusions 242 are preferably offset mirror images of the spoke fixing protrusions 241. In other words, the spoke fixing protrusions 242 are circumferentially offset from the spoke fixing protrusions 241 by an acute angle such as 15° and face in the opposite axial direction from the spoke fixing protrusions 241.

Each of the spoke fixing protrusions 242 is configured and arranged to fix a pair of the spokes 21 thereto using one of the spoke fixing elements 233. Each of the spoke fixing protrusions 242 is preferably identical as shown. Of course, the spoke fixing protrusions 242 do not need to be identical if needed and/or desired.

Thus, the fixing portions or protrusions 241 and 242 of the hub shell 232 are individual radial projections that are circumferentially spaced apart about opposite ends of the hub shell 32. Since the fixing protrusions 241 and 242 are identically configured and dimensioned, except for orientation, only the fixing protrusions 241 on the spoke mounting portion 232a of hub shell 232 will be discussed and/or illustrated in detail.

Each of the spoke fixing protrusions 241 of the hub shell 232 has an axially facing surface with an insertion opening 241a that is dimensioned to receive one of the fixing elements 233, and a pair of circumferentially facing surfaces with a spoke guide opening 241b. The spoke guide openings 241b are unthreaded closed holes or bores that extend from the circumferentially facing surfaces to the insertion opening 241a of the corresponding one of the spoke fixing protrusions 241. More specifically, the spoke guide openings 241b have center axes that extend outwardly at an obtuse angle (e.g., 159°) from the insertion opening 241a.

The fixing elements 233 are removably coupled to the fixing protrusions 241 and 242 of the hub shell 232. Each of the fixing elements 233 has a non-circular transverse cross section that matches a non-circular transverse cross section of the insertion openings 241a of the fixing protrusions 241. Thus, the fixing elements 233 are dimensioned to be inserted axially into the insertion openings 241a of the fixing protrusions 241 with the fixing elements 233 being non-rotatably mounted in the insertion openings 241a of the fixing protrusions 241. Each of the fixing elements 233 has a pair of threaded spoke attachment openings or bores 233a and 233b to attach a pair of the threaded inner end portions 21a of a pair of the spokes 21 to the hub shell 232. In this embodiment, each of the threaded spoke attachment openings or bores 233a and 233b forms a spoke attachment structure of the fixing element 233 that is configured and arranged to threadedly receive one of the threaded inner end portions 21a of one of the spokes 21. The threaded spoke attachment bores 233a and 233b (spoke attachment structures) of each of the fixing elements 233 lie on a flat or planar surface of the fixing elements 233 so that the threaded bores 233a and 233b are aligned with the spoke openings 241b. In other words, the insertion openings 241a have a pair of flat or planar surfaces that are aligned with the spoke openings 241b so that the threaded bores 233a and 233b are aligned with the spoke guide openings 241b. The threaded spoke attachment openings or bores 233a and 233b and the spoke guide openings 241b are arranged so that the spokes 21 from each of the fixing elements 233 extend outwardly at an obtuse angle (e.g., 159°). In other words, the center axes of the threaded bores 233a and 233b extend outwardly from each of the fixing elements 233 at an obtuse angle (e.g., 159°). In addition, the center axes of the threaded bores 233a and 233b are angled with respect to a plane that extends perpendicular to the center longitudinal axis of the fixing element 233. In particular, the threaded bores 233a forms an angle of about 4° with respect to a plane that extends perpendicular to the center longitudinal axis of the fixing element 233, while the threaded bores 233b forms an angle of about 5° with respect to a plane that extends perpendicular to the center longitudinal axis of the fixing element 233. The different angles of the center axes of the threaded bores 233a and 233b avoids interference between crossing pairs of the spokes 21.

Fourth Embodiment

Referring now to FIGS. 16-20, a front wheel 312 having a modified front hub 320 is illustrated in accordance with a fourth preferred embodiment. In view of the similarity between the fourth embodiment and the prior embodiments, the parts of the fourth embodiment that are identical to the parts of the prior embodiments will be given the same reference numerals as the parts of the prior embodiments. Moreover, the descriptions of the parts of the fourth embodiment that are identical to the parts of the prior embodiments may be omitted for the sake of brevity. In other words, unless otherwise specified, the configuration of the front wheel 312 of the fourth embodiment is the same as the configuration of the first embodiment.

In this embodiment, the hub 320 is identical to the hub 20 of the first embodiment, except that a modified hub shell 332 is used that has a plurality of modified spoke fixing elements 333. This embodiment uses the spokes 21 and the rim 22 of the first embodiment. In particular, the hub shell 332 is identical to the hub shell 32, except that the hub shell 332 includes a pair of modified spoke mounting portions 332a and 332b arranged at opposite ends of a tubular center portion 332c (identical to portion 32c). The remainder of the hub shell 332 is identical to the hub shell 32 as discussed above.

The spoke mounting portion 332a includes a plurality (six) of spoke fixing portions 341 that extend outwardly in a radial manner from one end of the hub shell 332. The spoke fixing portions 341 are equally spaced apart in a circumferential direction around the main body of the spoke mounting portion 332a. Each of the spoke fixing portions 341 is configured and arranged to fix a pair of the spokes 21 thereto using one of the spoke fixing elements 333. Each of the spoke fixing portions 341 is preferably identical as shown. Of course, the spoke fixing portions 341 do not need to be identical if needed and/or desired.

Likewise, the mounting portion 332b includes a plurality (six) of individual spoke fixing portions 342 that extend outwardly in a radial manner from one end of the hub shell 332. The spoke fixing portions 342 are equally spaced apart in a circumferential direction around the main body of the spoke mounting portion 332b. The spoke fixing portions 342 are preferably offset mirror images of the spoke fixing portions 341. In other words, the spoke fixing portions 342 are circumferentially offset from the spoke fixing portions 341 by an acute angle such as 15° and face in the opposite axial direction from the spoke fixing portions 341.

Each of the spoke fixing portions 342 is configured and arranged to fix a pair of the spokes 21 thereto using one of the spoke fixing elements 333. Each of the spoke fixing portions 342 is preferably identical as shown. Of course, the spoke fixing portions 342 do not need to be identical if needed and/or desired.

Thus, the spoke fixing portions 341 and 342 of the hub shell 332 are circumferentially spaced apart about opposite ends of the hub shell 332. Since the spoke fixing portions 341 and 342 are identically configured and dimensioned, except for orientation, only the fixing portions 341 on the spoke mounting portion 332a of hub shell 332 will be discussed and/or illustrated in detail.

Figure 17:
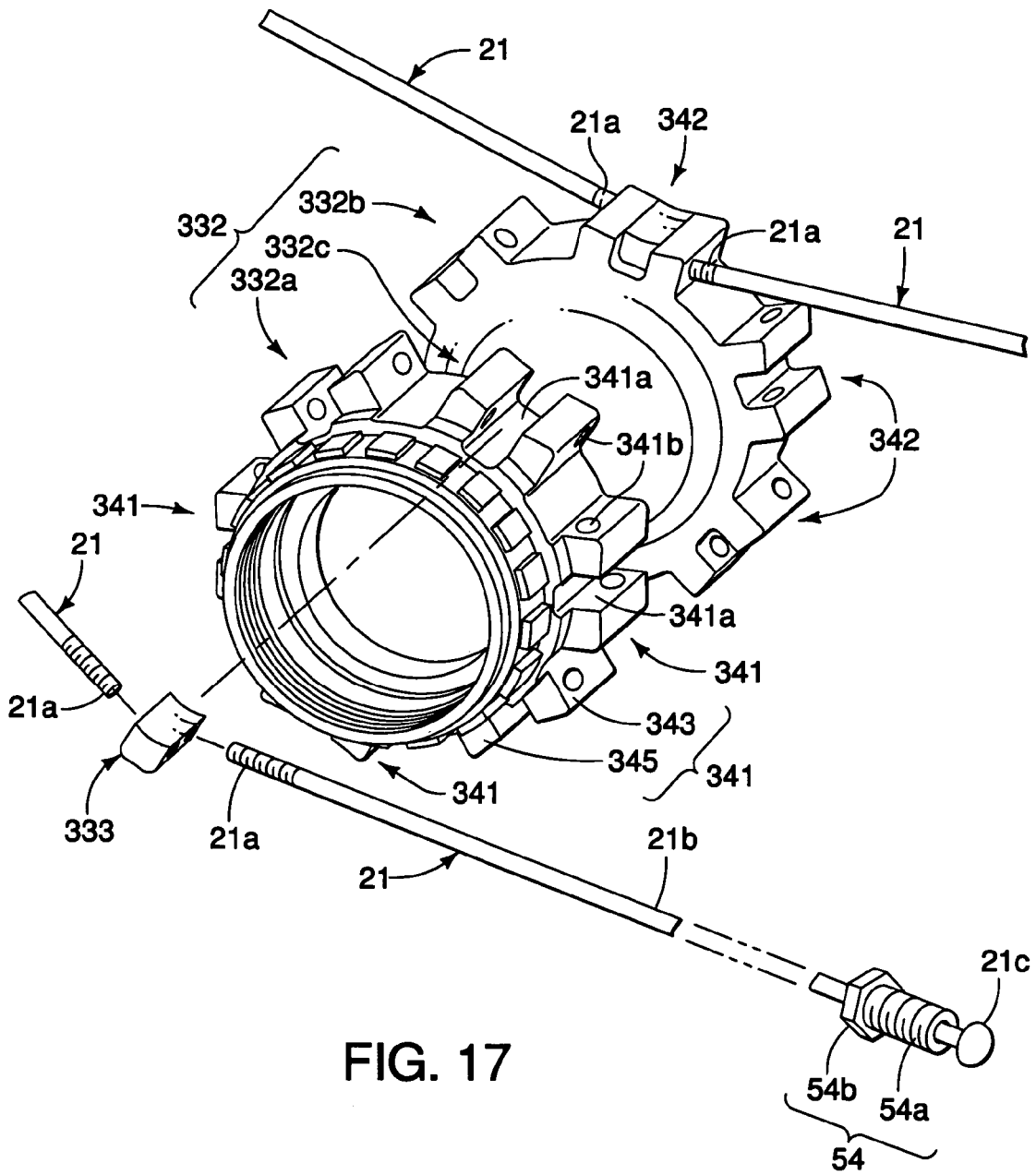
FIG. 17 is an exploded partial perspective view of the bicycle hub and some of the spokes of the front wheel illustrated in FIG. 16 in accordance with the fourth embodiment of the present invention.
Figure 18:
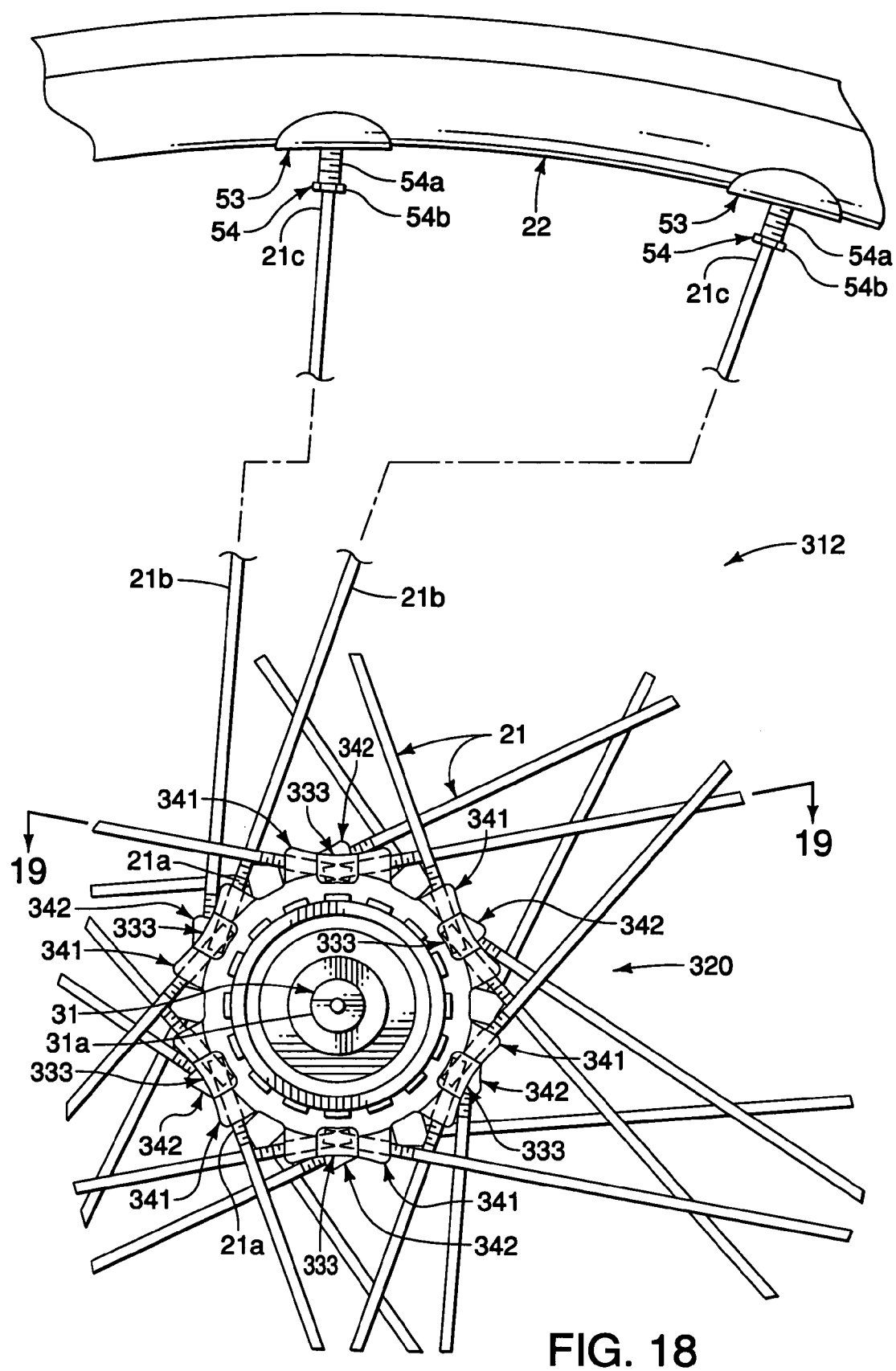
FIG. 18 is a partial side elevational view of the front wheel illustrated in FIGS. 16 and 17 in accordance with the fourth embodiment of the present invention.
Figure 19:
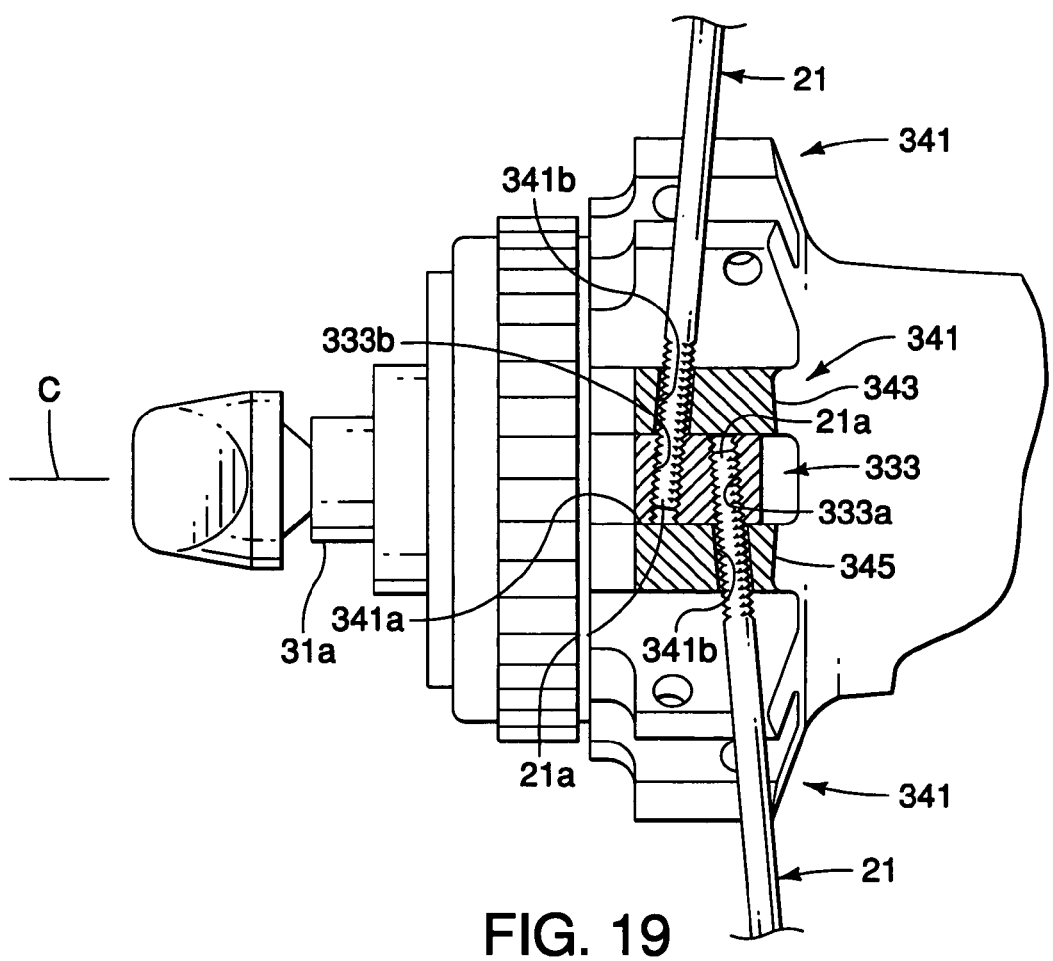
FIG. 19 is an enlarged, partial cross-sectional view of one end of the front hub illustrated in FIGS. 16-18, as viewed along section line 19-19 in FIG. 18, but with the majority of the spokes removed for the purpose of illustration.
Figure 20:
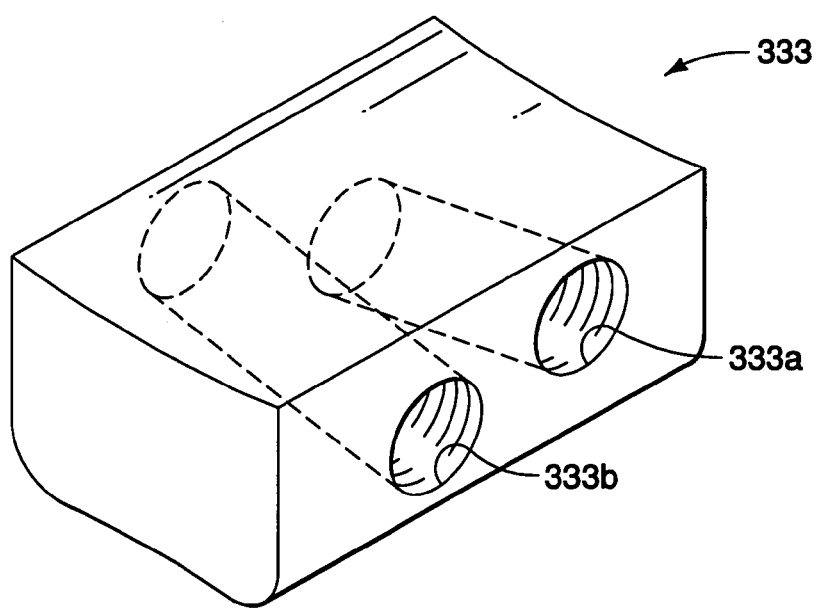
FIG. 20 is an enlarged perspective view of one of the fixing elements illustrated in FIGS. 16-19 in accordance with the fourth embodiment of the present invention.
Figure 21:
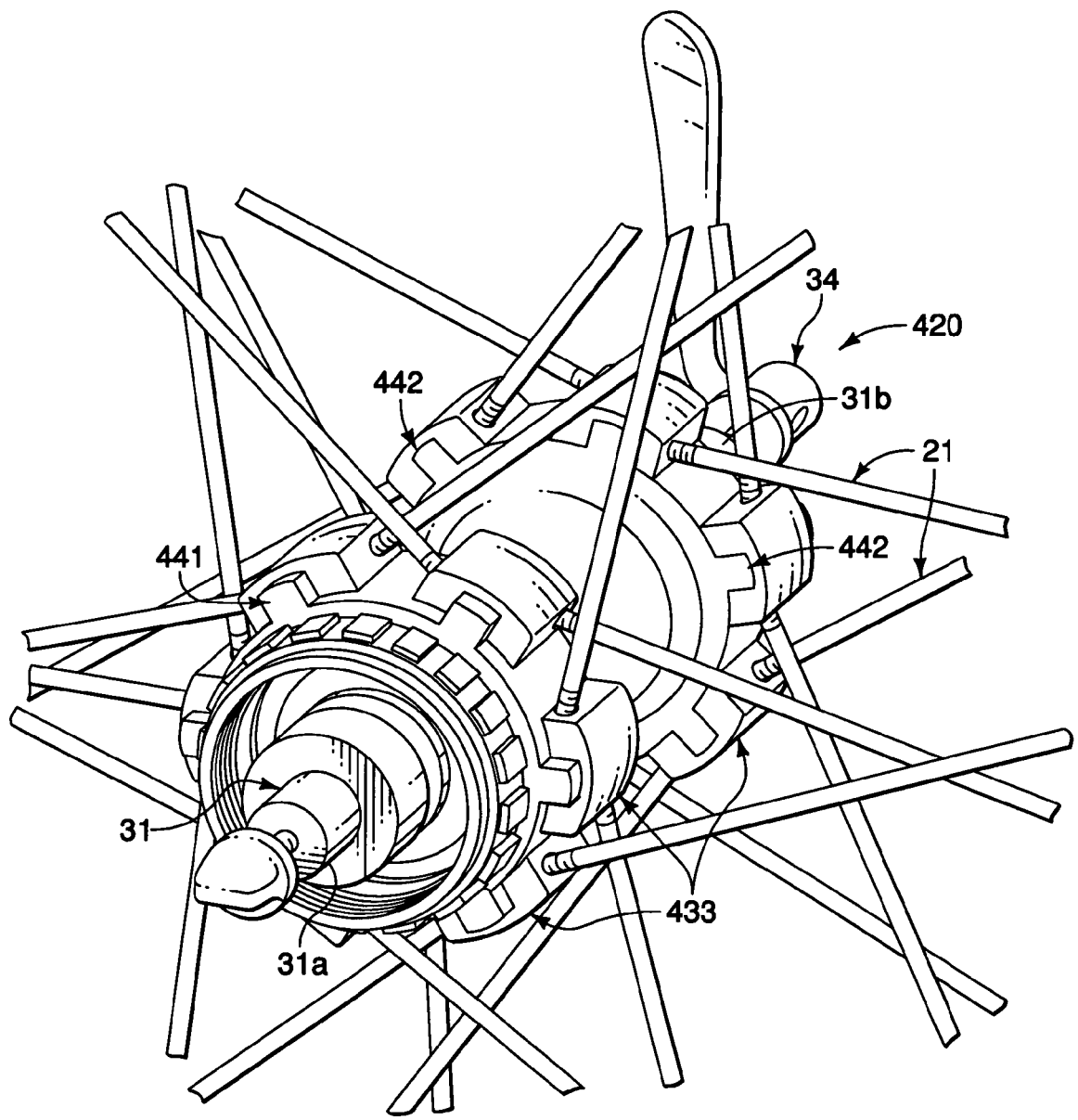
FIG. 21 is an enlarged partial perspective view of a bicycle hub and spokes of a front wheel in accordance with a fifth embodiment of the present invention.

As best seen in FIG. 17, each of the spoke fixing portions 341 preferably includes a pair of individual radially extending projections 343 and 345 in this embodiment. The projections 343 and 345 are spaced apart from each other to form insertion openings 341a therebetween that extend from axially facing surfaces of the projections 343 and 345. The insertion openings 341a are illustrated as being through openings (in the axial direction) in this embodiment. However, the insertion openings 341a could be closed (or partially closed) at one or both axial ends if needed and/or desired in order to more easily axially locate the fixing elements 333 if needed and/or desired. In any case, the insertion openings 341a are preferably open in the radial direction such that the fixing elements 333 contact an exterior surface of the hub shell 332. Each insertion opening 341a is dimensioned to receive one of the fixing elements 333 in a non-rotatable manner, even before the spokes 21 are coupled to the fixing elements 333.

Each of the projections 343 and 345 has a pair of substantially circumferentially facing surfaces with a spoke guide opening 341b extending therefrom. In this embodiment, the guide openings 341b are closed, unthreaded through holes or through bores that extend between the oppositely facing circumferential surfaces of the projections 343 and 345 to the insertion opening 341a of the corresponding one of the spoke fixing portions 341. More specifically, the spoke guide openings 341b of each fixing portion 341 have center axes that extend outwardly at an obtuse angle (e.g., 159°) relative to each other. Each pair of spoke guide openings 341b extend outwardly from one of the insertion openings 341a. The guide openings 341b are identical to each other, except for their orientations. Thus, the guide openings 341b have been given identical reference numerals for the sake of convenience.

The fixing elements 333 are removably coupled to the fixing portions 341 and 342 of the hub shell 332. Each of the fixing elements 333 has a non-circular transverse cross section that matches a non-circular transverse cross section of the insertion openings 341a of the fixing portions 341. Thus, the fixing elements 333 are dimensioned to be inserted axially into the insertion openings 341a of the fixing portions 341 with the fixing elements 333 being non-rotatably mounted in the insertion openings 341a of the fixing portions 341. Each of the fixing elements 333 has a pair of threaded spoke attachment openings or bores 333a and 333b to attach a pair of the threaded inner end portions 21a of a pair of the spokes 21 to the hub shell 332. In this embodiment, each of the threaded spoke attachment openings or bores 333a and 333b forms a spoke attachment structure of the fixing element 333 that is configured and arranged to threadedly receive one of the threaded inner end portions 21a of one of the spokes 21. The threaded spoke attachment openings 333a and 333b (spoke attachment structures) of each of the fixing elements 333 are preferably through bores that extend between a pair of substantially circumferentially facing (substantially flat or planar surfaces) surfaces of the fixing elements 333 so that the threaded bores 333a and 333b are aligned with the spoke guide openings 341b. In other words, the fixing elements 333 have a pair of opposed substantially circumferentially facing (substantially flat or planar surfaces) surfaces that contact the projections 343 and 345 so that the threaded bores 333a and 333b are aligned with the spoke guide openings 341b. The threaded spoke attachment openings or bores 333a and 333b and the spoke guide openings 341b are arranged so that the spokes 21 from each of the fixing elements 333 extend outwardly at an obtuse angle (e.g., 159°). In other words, the center axes of the threaded bores 333a and 333b extend outwardly from each of the fixing elements 333 at an obtuse angle (e.g., 159°). Thus, the spoke guide openings 341b are arranged to define an obtuse angle as measured between oppositely facing entrance apertures or openings of the spoke guide openings 341b. In addition, the center axes of the threaded bores 333a and 333b are angled with respect to a plane that extends perpendicular to the center longitudinal axis of the fixing element 333. In particular, the threaded bores 333a forms an angle of about 4° with respect to a plane that extends perpendicular to the center longitudinal axis of the fixing element 333, while the threaded bores 333b forms an angle of about 5° with respect to a plane that extends perpendicular to the center longitudinal axis of the fixing element 333. The different angles of the center axes of the threaded bores 333a and 333b avoids interference between crossing pairs of the spokes 21.

In this embodiment, the insertion openings 341a are open in outer radial direction such that the fixing elements 333 contact an exterior surface of the hub shell 332 when assembled together. In other words, the fixing portions 341 and the fixing elements 333 are configured and arranged such that each of the fixing elements 333 contacts an exterior surface of the hub shell 332 when assembled together. Moreover, the fixing portions 341 and the fixing elements 333 are configured and arranged such that the fixing elements 333 are non-rotatable relative to the fixing portions 341 when assembled together before the spokes 21 are received in the threaded spoke attachment openings 333a and 333b. Preferably, the spoke attachment openings 333a and 333b are arranged in the fixing elements 333 so as to be aligned with the guide openings 341b when one of the axial end surfaces of each fixing element 333 is aligned or substantially flush with an axial face of a corresponding fixing portion 341 as viewed in a radial direction, as best understood from FIGS. 16 and 19. However, it will be apparent to those skilled in the art from this disclosure that other alignment structures could be utilized (e.g. to align the spoke attachment openings 333a and 333b with the guide openings 341b), if needed and/or desired.

Fifth Embodiment

Referring now to FIGS. 21-25, a front wheel 412 with a modified front hub 420 is illustrated in accordance with a fifth preferred embodiment. In view of the similarity between the fifth embodiment and the prior embodiments, the parts of the fifth embodiment that are identical to the parts of the prior embodiments will be given the same reference numerals as the parts of the prior embodiments. Moreover, the descriptions of the parts of the fifth embodiment that are identical to the parts of the prior embodiments may be omitted for the sake of brevity. In other words, unless otherwise specified, the configuration of the front wheel 412 of the fifth embodiment is the same as the configuration of the first embodiment.

In this embodiment, the hub 420 is identical to the hub 20 of the first embodiment, except that a modified hub shell 432 is used that has a plurality of modified spoke fixing elements 433. This embodiment uses the spokes 21 and the rim 22 of the first embodiment. In particular, the hub shell 432 is identical to the hub shell 32, except that the hub shell 432 includes a pair of modified spoke mounting portions 432a and 432b arranged at opposite ends of a tubular center portion 432c (identical to portion 32c). The remainder of the hub shell 432 is identical to the hub shell 32 as discussed above.

The spoke mounting portion 432a includes a plurality (six) of spoke fixing portions 441 that extend outwardly in a radial manner from one end of the hub shell 432. The spoke fixing portions 441 are equally spaced apart in a circumferential direction around the main body of the spoke mounting portion 432a. Each of the spoke fixing portions 441 is configured and arranged to fix a pair of the spokes 21 thereto using one of the spoke fixing elements 433. Each of the spoke fixing portions 441 is preferably identical as shown. Of course, the spoke fixing portions 441 do not need to be identical if needed and/or desired.

Likewise, the mounting portion 432b includes a plurality (six) of individual spoke fixing portions 442 that extend outwardly in a radial manner from one end of the hub shell 432. The spoke fixing portions 442 are equally spaced apart in a circumferential direction around the main body of the spoke mounting portion 432b. The spoke fixing portions 442 are preferably offset mirror images of the spoke fixing portions 441. In other words, the spoke fixing portions 442 are circumferentially offset from the spoke fixing portions 441 by an acute angle such as 15° and face in the opposite axial direction from the spoke fixing portions 441.

Each of the spoke fixing portions 442 is configured and arranged to fix a pair of the spokes 21 thereto using one of the spoke fixing elements 433. Each of the spoke fixing portions 442 is preferably identical as shown. Of course, the spoke fixing portions 442 do not need to be identical if needed and/or desired.

Thus, the spoke fixing portions 441 and 442 of the hub shell 432 are circumferentially spaced apart about opposite ends of the hub shell 432. Since the spoke fixing portions 441 and 442 are identically configured and dimensioned, except for orientation, only the fixing portions 441 on the spoke mounting portion 432a of hub shell 432 will be discussed and/or illustrated in detail.

Figure 22:
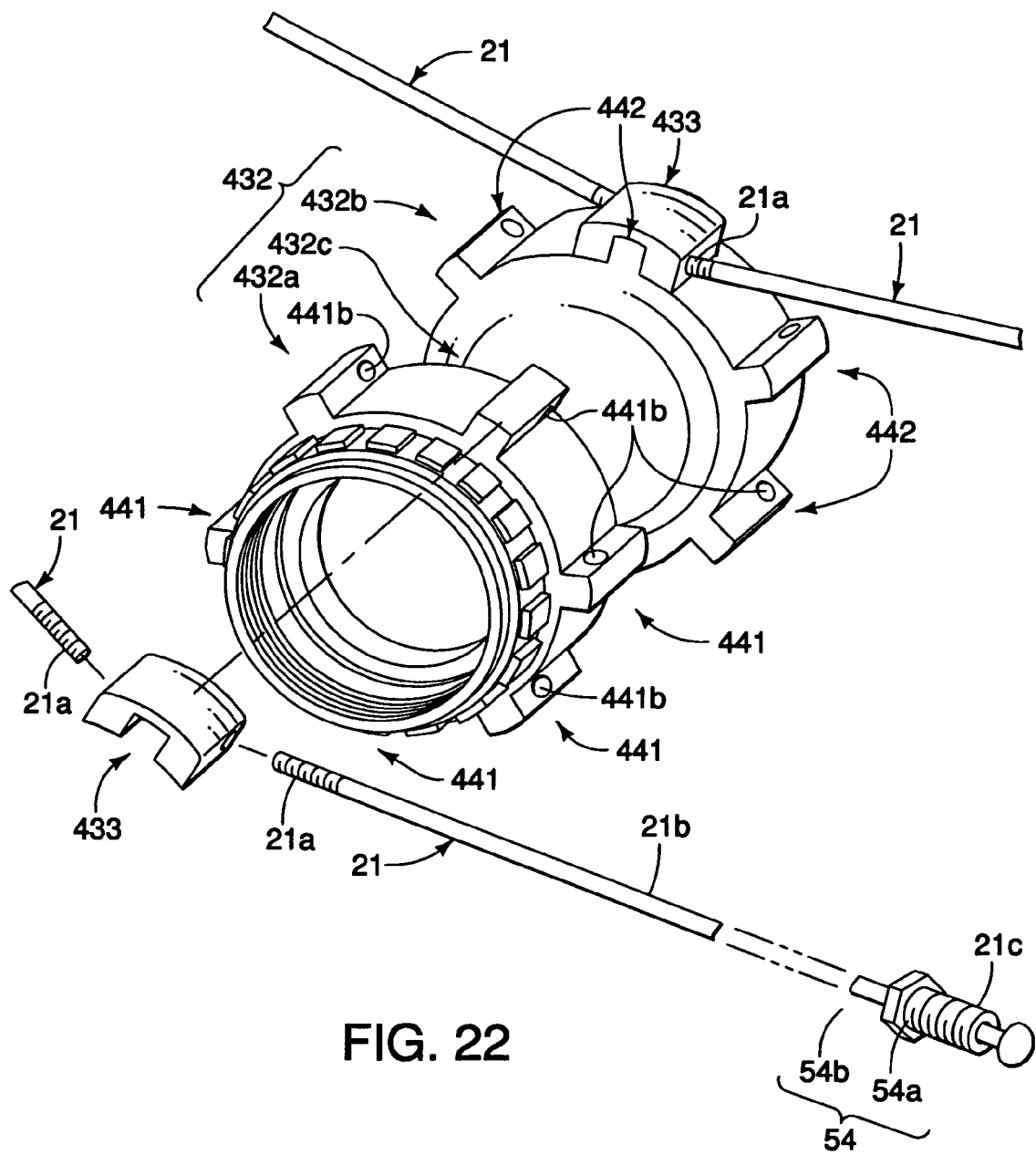
FIG. 22 is an exploded partial perspective view of the bicycle hub and some of the spokes of the front wheel illustrated in FIG. 21 in accordance with the fifth embodiment of the present invention.
Figure 23:
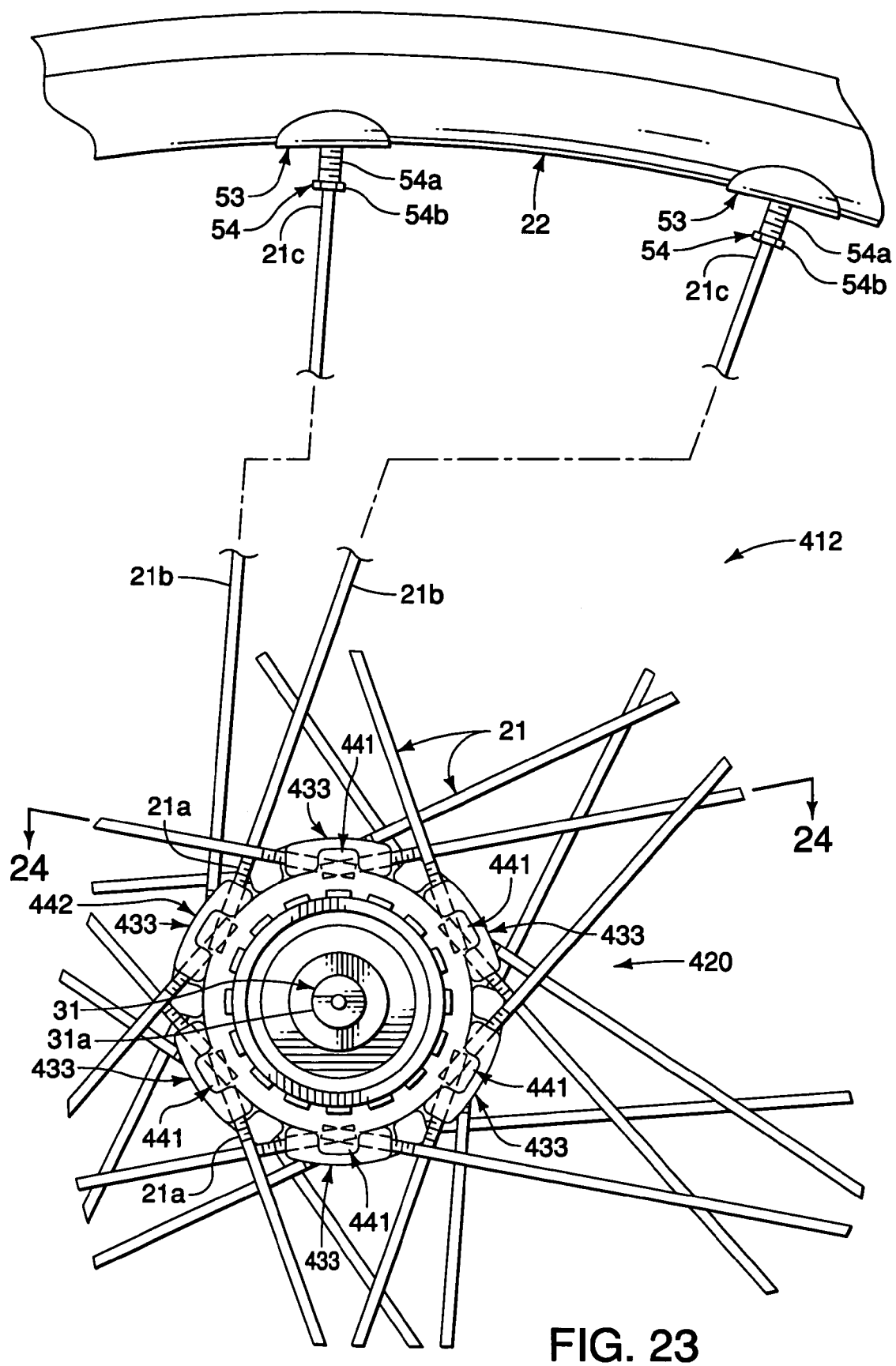
FIG. 23 is a partial side elevational view of the front wheel illustrated in FIGS. 21 and 22 in accordance with the fifth embodiment of the present invention.
Figure 24:
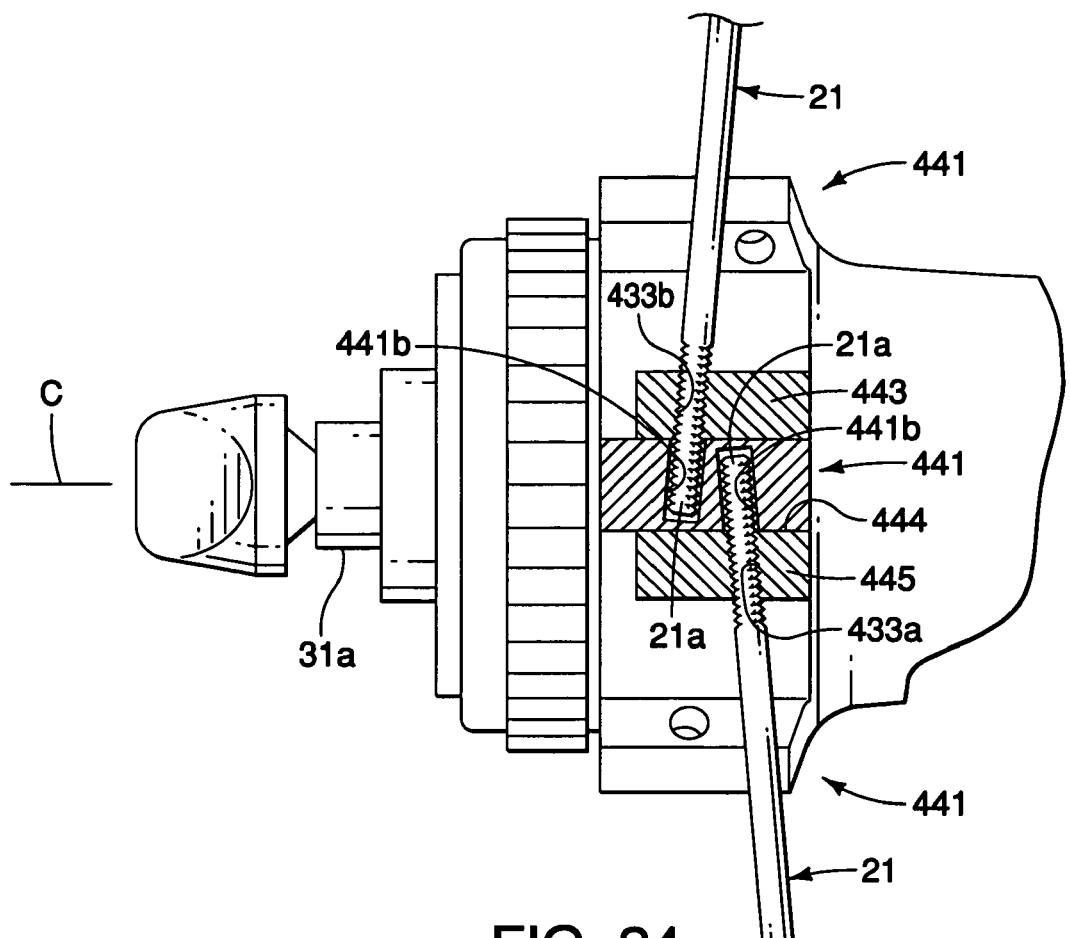
FIG. 24 is an enlarged, partial cross-sectional view of one end of the front hub illustrated in FIGS. 21-23, as viewed along section line 24-24 in FIG. 23, but with the majority of the spokes removed for the purpose of illustration.
Figure 25:
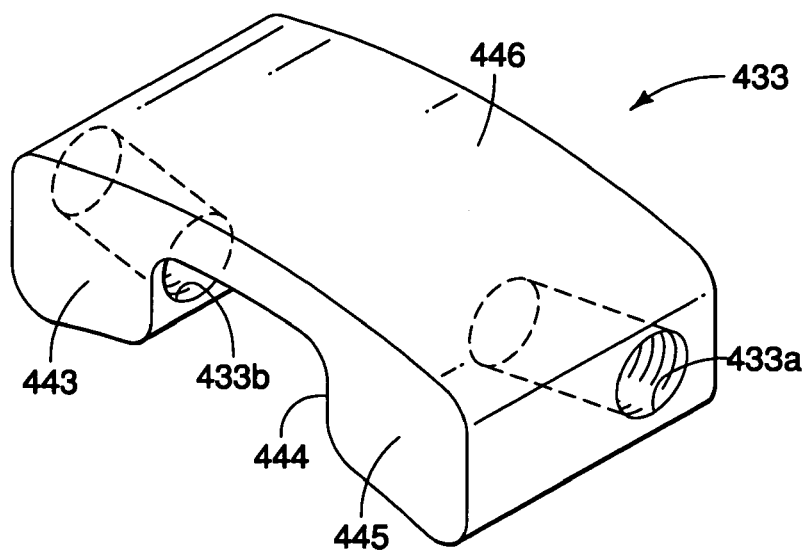
FIG. 25 is an enlarged perspective view of one of the fixing elements illustrated in FIGS. 21-24 in accordance with the fifth embodiment of the present invention.
Figure 26:
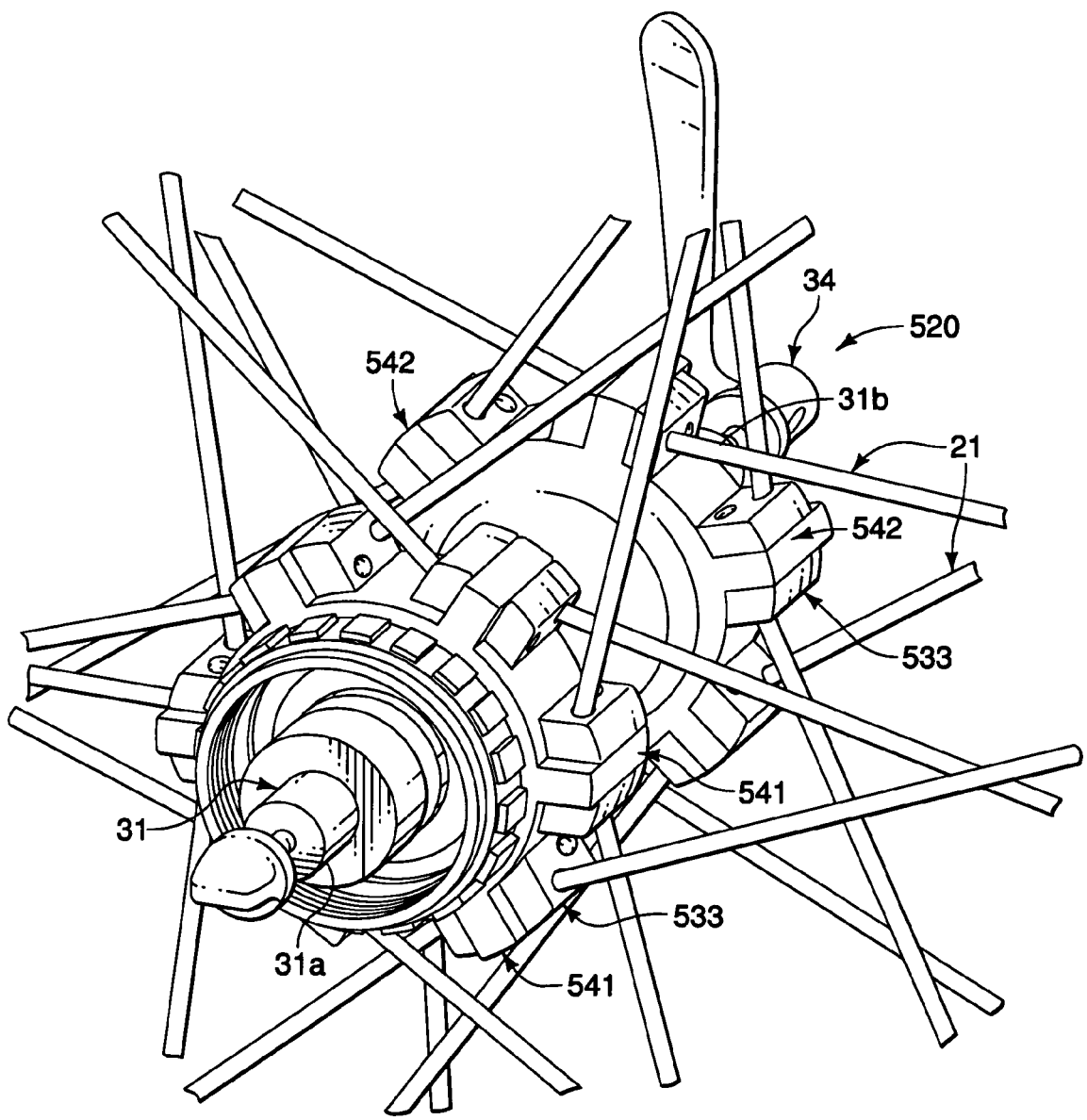
FIG. 26 is an enlarged partial perspective view of a bicycle hub and spokes of a front wheel in accordance with a sixth embodiment of the present invention.

As best seen in FIG. 22, each of the spoke fixing portions 441 is an individual radially extending projection in this embodiment similar to the first, second and third embodiments. The fixing projections or portions 441 do not include insertion openings for receiving the fixing elements 433 therein like the previous embodiments. Rather, the fixing elements 433 are mounted on the fixing portions 441, as explained below. Thus, the fixing elements 433 contact an exterior surface of the hub shell 432, as explained in more detail below. In any case, the fixing portions 441 and the fixing elements 433 are dimensioned to fit together in a non-rotatable manner, even before the spokes 21 are coupled to the fixing elements 433.

Each of the fixing portions or projections 441 has a pair of substantially circumferentially facing surfaces with a pair of spoke guide openings 441b extending therefrom. In this embodiment, the guide openings 441b are closed, unthreaded blind holes or blind bores that extend from the oppositely facing circumferential surfaces of the spoke fixing portions 441. More specifically, the spoke guide openings 441b have center axes that extend outwardly at an obtuse angle (e.g., 159°) from the fixing portions 441. The guide openings 441b are identical to each other, except for their orientations. Thus, the guide openings 441b have been given identical reference numerals for the sake of convenience.

The fixing elements 433 are removably coupled to the fixing portions 441 and 442 of the hub shell 432. Each of the fixing elements 433 preferably has a non-circular transverse cross section with a notch that matches a non-circular transverse cross sectional shape of the fixing portions 441. Thus, the fixing elements 433 are dimensioned to be slid axially onto the fixing portions 441 such that the fixing elements 433 are non-rotatable relative to the fixing portions 441. Each of the fixing elements 433 has a pair of threaded spoke attachment openings or bores 433a and 433b to attach a pair of the threaded inner end portions 21a of a pair of the spokes 21 to the hub shell 432. In this embodiment, each of the threaded spoke attachment openings or bores 433a and 433b forms a spoke attachment structure of the fixing element 433 that is configured and arranged to threadedly receive one of the threaded inner end portions 21a of one of the spokes 21. The threaded spoke attachment openings 433a and 433b (spoke attachment structures) of each of the fixing elements 433 are preferably through bores that extend between a pair of substantially circumferentially facing (substantially flat or planar surfaces) surfaces of the fixing elements 433 so that the threaded bores 433a and 433b are aligned with the spoke guide openings 441b. In particular, each of the fixing elements 433 includes a pair of circumferentially spaced fixing sections 443 and 445 with a connecting section 446 extending between the fixing sections to form a slot 444 that receives one of the fixing portions 441 in a non-rotatable manner. The fixing section 443 is arranged on a first circumferential side of one of the radially extending fixing projections 441 when assembled together and the fixing section 445 is arranged on an opposite circumferential side of the radially extending fixing projection 441 when assembled together. Each of the fixing sections 443 has one of the spoke attachment openings 433b formed therein and each of the fixing sections 445 has one of the spoke attachment openings 433a formed therein. In other words, the fixing portions 441 have a pair of opposed substantially circumferentially facing (substantially flat or planar surfaces) surfaces that contact the fixing sections 443 and 445 so that the threaded bores 433a and 433b are aligned with the spoke guide openings 441b. The threaded spoke attachment openings or bores 433a and 433b and the spoke guide openings 441b are arranged so that the spokes 21 from each of the fixing elements 433 extend outwardly at an obtuse angle (e.g., 159°). In other words, the center axes of the threaded bores 433a and 433b extend outwardly from each of the fixing elements 433 at an obtuse angle (e.g., 159°). Thus, the spoke guide openings 441b are arranged to define an obtuse angle as measured between oppositely facing entrance apertures or openings of the spoke guide openings 441b (i.e. the open ends). In addition, the center axes of the threaded bores 433a and 433b are angled with respect to a plane that extends perpendicular to the center longitudinal axis of the fixing element 433. In particular, the threaded bores 433a forms an angle of about 4° with respect to a plane that extends perpendicular to the center longitudinal axis of the fixing element 433, while the threaded bores 433b forms an angle of about 5° with respect to a plane that extends perpendicular to the center longitudinal axis of the fixing element 433. The different angles of the center axes of the threaded bores 433a and 433b avoids interference between crossing pairs of the spokes 21.

In this embodiment, the fixing elements 433 contact an exterior surface of the hub shell 432 when mounted on to the fixing portions 441. In other words, the fixing portions 441 and the fixing elements 433 are configured and arranged such that each of the fixing elements 433 contact an exterior surface of the hub shell 432 when assembled together. Moreover, the fixing portions 441 and the fixing elements 433 are configured and arranged such that the fixing elements 433 are non-rotatable relative to the fixing portions 441 when assembled together before the spokes 21 are received in the threaded spoke attachment openings 433a and 433b. Preferably, the spoke attachment openings 433a and 433b are arranged in the fixing elements 433 so as to be aligned with the guide openings 441b when one of the axial end surfaces of each fixing element 433 is aligned or substantially flush with an axial face of a corresponding fixing portion 441 as viewed in a radial direction, as best understood from FIGS. 21 and 24. However, it will be apparent to those skilled in the art from this disclosure that other alignment structures could be utilized (e.g. to align the spoke attachment openings 433a and 433b with the guide openings 441b), if needed and/or desired.

In this embodiment, the connecting section 447 is integrally formed with the fixing sections 443 and 445 as a one-piece, unitary member to form each of the fixing elements 433. In any case, the connecting section 447 is non-movably fixed to the fixing sections 443 and 445.

Sixth Embodiment

Referring now to FIGS. 26-30, a front wheel 512 with a modified front hub 520 is illustrated in accordance with a sixth preferred embodiment. In view of the similarity between the sixth embodiment and the prior embodiments, the parts of the sixth embodiment that are identical to the parts of the prior embodiments will be given the same reference numerals as the parts of the prior embodiments. Moreover, the descriptions of the parts of the sixth embodiment that are identical to the parts of the prior embodiments may be omitted for the sake of brevity. In other words, unless otherwise specified, the configuration of the front wheel 512 of the sixth embodiment is the same as the configuration of the first embodiment.

In this embodiment, the hub 520 is identical to the hub 20 of the first embodiment, except that a modified hub shell 532 is used that has a plurality of modified spoke fixing elements 533. In particular, this embodiment is very similar to the fifth embodiment. This embodiment uses the spokes 21 and the rim 22 of the first embodiment. In particular, the hub shell 532 is identical to the hub shell 32, except that the hub shell 532 includes a pair of modified spoke mounting portions 532a and 532b arranged at opposite ends of a tubular center portion 532c (identical to portion 32c). The remainder of the hub shell 532 is identical to the hub shell 32 as discussed above.

The spoke mounting portion 532a includes a plurality (six) of spoke fixing portions 541 that extend outwardly in a radial manner from one end of the hub shell 532. The spoke fixing portions 541 are equally spaced apart in a circumferential direction around the main body of the spoke mounting portion 532a. Each of the spoke fixing portions 541 is configured and arranged to fix a pair of the spokes 21 thereto using one of the spoke fixing elements 533. Each of the spoke fixing portions 541 is preferably identical as shown. Of course, the spoke fixing portions 541 do not need to be identical if needed and/or desired.

Likewise, the mounting portion 532b includes a plurality (six) of individual spoke fixing portions 542 that extend outwardly in a radial manner from one end of the hub shell 532. The spoke fixing portions 542 are equally spaced apart in a circumferential direction around the main body of the spoke mounting portion 532b. The spoke fixing portions 542 are preferably offset mirror images of the spoke fixing portions 541. In other words, the spoke fixing portions 542 are circumferentially offset from the spoke fixing portions 541 by an acute angle such as 15° and face in the opposite axial direction from the spoke fixing portions 541.

Each of the spoke fixing portions 542 is configured and arranged to fix a pair of the spokes 21 thereto using one of the spoke fixing elements 533. Each of the spoke fixing portions 542 is preferably identical as shown. Of course, the spoke fixing portions 542 do not need to be identical if needed and/or desired.

Thus, the spoke fixing portions 541 and 542 of the hub shell 532 are circumferentially spaced apart about opposite ends of the hub shell 532. Since the spoke fixing portions 541 and 542 are identically configured and dimensioned, except for orientation, only the fixing portions 541 on the spoke mounting portion 532a of hub shell 532 will be discussed and/or illustrated in detail.

Figure 27:
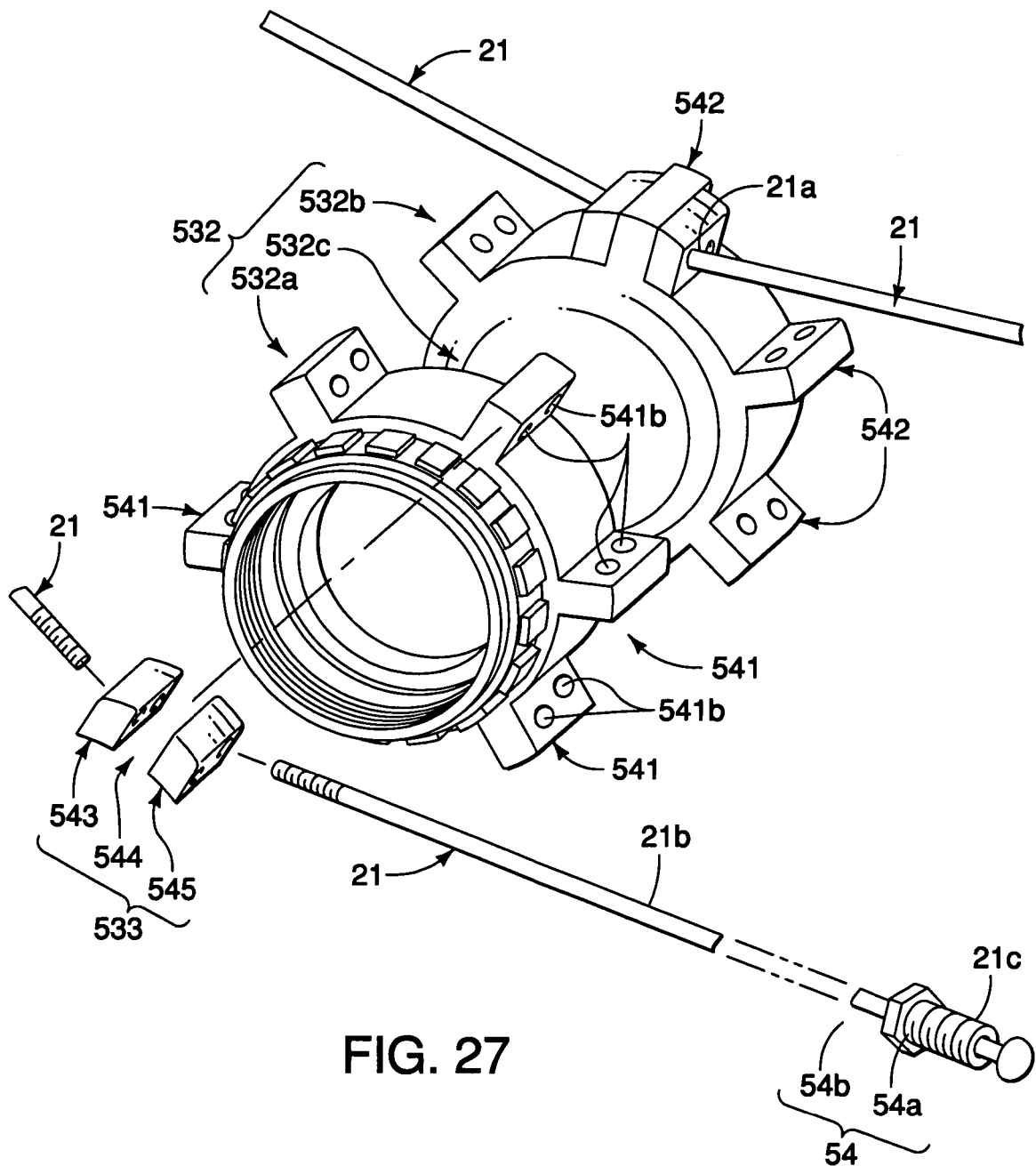
FIG. 27 is an exploded partial perspective view of the bicycle hub and some of the spokes of the front wheel illustrated in FIG. 27 in accordance with the sixth embodiment of the present invention.
Figure 28:
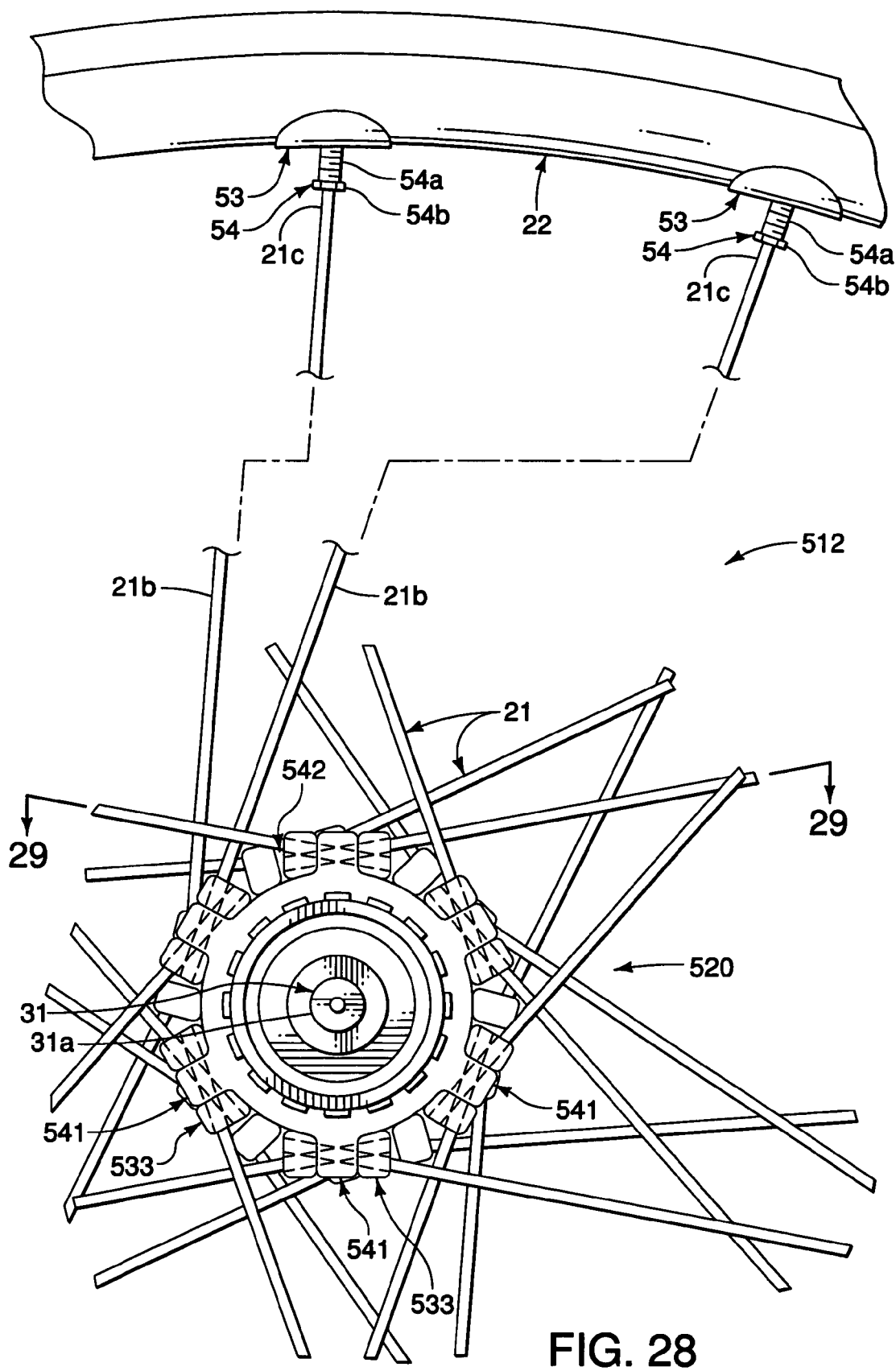
FIG. 28 is a partial side elevational view of the front wheel illustrated in FIGS. 26 and 27 in accordance with the sixth embodiment of the present invention.
Figure 29:
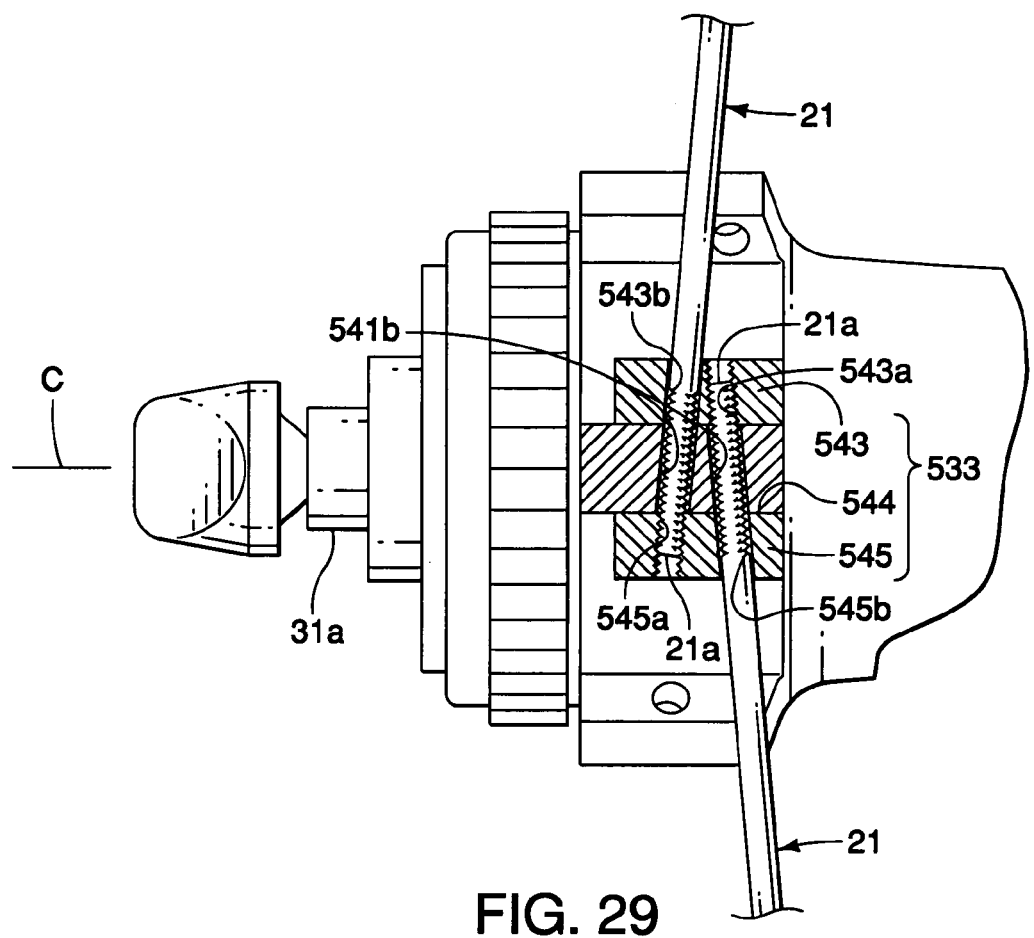
FIG. 29 is an enlarged, partial cross-sectional view of one end of the front hub illustrated in FIGS. 26-28, as viewed along section line 29-29 in FIG. 28, but with the majority of the spokes removed for the purpose of illustration.
Figure 30:
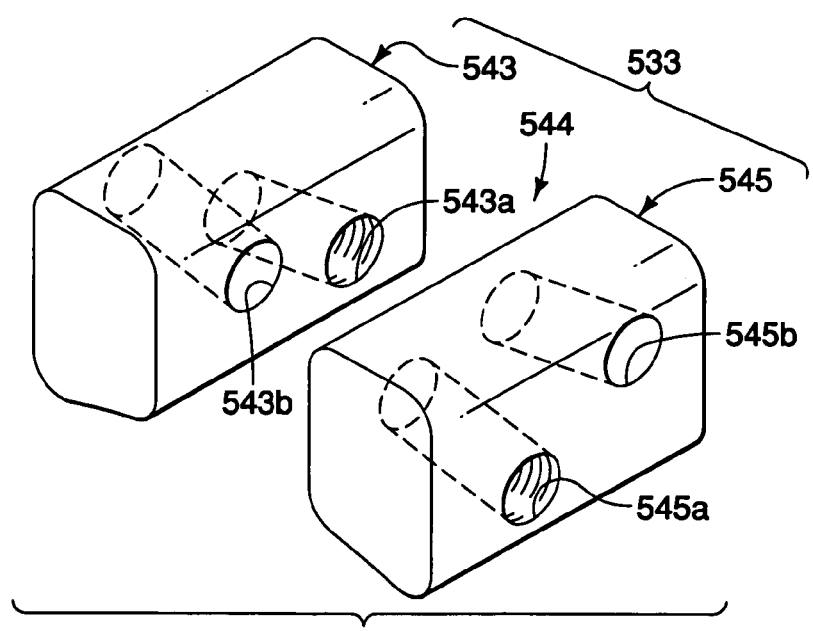
FIG. 30 is an enlarged perspective view of one of the fixing elements (including a pair of separate fixing sections) illustrated in FIGS. 26-29 in accordance with the sixth embodiment of the present invention.

As best seen in FIG. 27, each of the spoke fixing portions 541 is an individual radially extending projection in this embodiment similar to the first, second, third and fifth embodiments. The fixing projections or portions 541 do not include insertion openings for receiving the fixing elements 533 therein like the first, second and third embodiments. Rather, the fixing elements 533 are mounted on the fixing portions 541, as explained below. Thus, the fixing elements 533 contact an exterior surface of the hub shell 532, as explained in more detail below. In any case, the fixing portions 541 and the fixing elements 533 are dimensioned to fit together in a non-rotatable manner, even before the spokes 21 are coupled to the fixing elements 533.

Each of the fixing portions or projections 541 has a pair of substantially circumferentially facing surfaces with a pair of spoke guide openings 541b extending therefrom. In this embodiment, the guide openings 541b are closed, unthreaded through holes or through bores that extend from the oppositely facing circumferential surfaces of the spoke fixing portions 541. More specifically, the spoke guide openings 541b have center axes that extend outwardly at an obtuse angle (e.g., 159°) from the fixing portions 541. The guide openings 541b are identical to each other, except for their orientations. Thus, the guide openings 541b have been given identical reference numerals for the sake of convenience.

The fixing elements 533 are removably coupled to the fixing portions 541 and 542 of the hub shell 532. Each of the fixing elements 533 preferably has a portion with a non-circular transverse cross sectional shape that matches a non-circular transverse cross sectional shape of part of the fixing portions 541. Thus, the fixing elements 533 are dimensioned to be slid axially onto the fixing portions 541 such that the fixing elements 533 are non-rotatable relative to the fixing portions 541. Each of the fixing elements 533 has a pair of threaded spoke attachment openings or bores 543a and 545a to attach a pair of the threaded inner end portions 21a of a pair of the spokes 21 to the hub shell 532. In this embodiment, each of the threaded spoke attachment openings or bores 543a and 545a forms a spoke attachment structure of the fixing element 533 that is configured and arranged to threadedly receive one of the threaded inner end portions 21a of one of the spokes 21. The threaded spoke attachment openings 543a and 545a (spoke attachment structures) of each of the fixing elements 533 are preferably through bores that extend between a pair of substantially circumferentially facing (substantially flat or planar surfaces) surfaces of the fixing elements 533 so that the threaded bores 543a and 545a are aligned with the spoke guide openings 541b. In particular, each of the fixing elements 533 includes a pair of circumferentially spaced fixing sections 543 and 545 to form a slot 544 that receives one of the fixing portions 541 in a non-rotatable manner. The fixing section 543 is arranged on a first circumferential side of one of the radially extending fixing projections 541 when assembled together and the fixing section 545 is arranged on an opposite circumferential side of the radially extending fixing projection 541 when assembled together. Each of the fixing sections 543 has one of the spoke attachment openings 543a formed therein and each of the fixing sections 545 has one of the spoke attachment openings 545a formed therein. In other words, the fixing portions 541 have a pair of opposed substantially circumferentially facing (substantially flat or planar surfaces) surfaces that contact the fixing sections 543 and 545 so that the threaded bores 543a and 545a are aligned with the spoke guide openings 541b. The threaded spoke attachment openings or bores 543a and 545a and the spoke guide openings 541b are arranged so that the spokes 21 from each of the fixing elements 533 extend outwardly at an obtuse angle (e.g., 159°). In other words, the center axes of the threaded bores 543a and 545a extend outwardly from each of the fixing elements 533 at an obtuse angle (e.g., 159°). Thus, the spoke guide openings 541b are arranged to define an obtuse angle as measured between oppositely facing entrance apertures or openings of the spoke guide openings 541b (i.e. the oppositely facing open ends). In addition, the center axes of the threaded bores 543a and 545a are angled with respect to a plane that extends perpendicular to the center longitudinal axis of the fixing element 533. In particular, the threaded bores 543a forms an angle of about 4° with respect to a plane that extends perpendicular to the center longitudinal axis of the fixing element 533, while the threaded bores 545a forms an angle of about 5° with respect to a plane that extends perpendicular to the center longitudinal axis of the fixing element 533. The different angles of the center axes of the threaded bores 543a and 545a avoids interference between crossing pairs of the spokes 21.

In this embodiment, the fixing element 543 includes a guide aperture 543b that is aligned with one of the spoke guide openings 541b and the threaded spoke attachment opening 545a of the fixing element 545 when assembled. Similarly, the fixing element 545 includes a guide aperture 545b that is aligned with one of the spoke guide openings 541b and the threaded spoke attachment opening 543a of the fixing element 543 when assembled. The inner ends 21a of the spokes 21 are first inserted through the guide apertures 543b and 545b, then into the spoke guide openings 541b of the fixing portions 541, and then are threadedly attached in the threaded spoke attachment openings 543a and 545a during assembly. In any case, the fixing elements 533 contact an exterior surface of the hub shell 532 when mounted on to the fixing portions 541. In other words, the fixing portions 541 and the fixing elements 533 are configured and arranged such that each of the fixing elements 533 contact an exterior surface of the hub shell 532 when assembled together. Moreover, the fixing portions 541 and the fixing elements 533 are configured and arranged such that the fixing elements 533 are non-rotatable relative to the fixing portions 541 when assembled together before the spokes 21 are received in the threaded spoke attachment openings 543a and 545a. Preferably, the spoke attachment openings 543a and 545a are arranged in the fixing elements 533 so as to be aligned with the guide openings 541b when one of the axial end surfaces of each fixing element 533 (i.e. of both fixing elements 543 and 545) is aligned or substantially flush with an axial face of a corresponding fixing portion 541 as viewed in a radial direction, as best understood from FIGS. 26 and 29. However, it will be apparent to those skilled in the art from this disclosure that other alignment structures could be utilized (e.g. to align the spoke attachment openings 543a and 545a with the guide openings 541b), if needed and/or desired. In this embodiment, the fixing sections 543 and 545 are constructed as separate members that are each preferably constructed as a one-piece, unitary member to form each of the fixing elements 533.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "member" or "element" when used in the singular can have the dual meaning of a single part or a plurality of parts. Also as used herein to describe the present invention, the following directional terms "forward, rearward, above, downward, vertical, horizontal, below and transverse" as well as any other similar directional terms refer to those directions of a bicycle equipped with the present invention. Accordingly, these terms, as utilized to describe the present invention should be interpreted relative to a bicycle equipped with the present invention. Finally, terms of degree such as "substantially", "about" and "approximately" as used herein mean a reasonable amount of deviation of the modified term such that the end result is not significantly changed. These terms of degree should be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A bicycle hub comprising:
   an axle;
   a hub shell rotatably disposed about the axle, the hub shell having a plurality of fixing portions disposed at an end thereof, each of the fixing portions having a first spoke guide opening and a second spoke guide opening; and
   a plurality of fixing elements removably coupled to the fixing portions of the hub shell, each of the fixing elements including a first spoke attachment structure arranged to removably attach an inner end of a first spoke and a second spoke attachment structure arranged to removably attach an inner end of a second spoke that is separate from the first spoke,
   the fixing portions and the fixing elements being configured and arranged such that each of the fixing elements contacts an exterior surface of the hub shell when assembled together, the exterior surface of the hub shell and the fixing elements being configured and arranged such that the fixing elements are movable radially inwardly from non-assembled positions into contact with the exterior surface of the hub shell.

2. The bicycle hub according to claim 1, wherein each of the fixing portions includes an individual radially extending projection having the first and second spoke guide openings formed therein.

3. The bicycle hub according to claim 2, wherein each of the fixing elements includes a first fixing section arranged on a first circumferential side of one of the radially extending projections when assembled together and a second fixing section arranged on an opposite circumferential side of the one of the radially extending projections when assembled together, and the first fixing section includes the first spoke attachment structure and the second fixing section includes the second spoke attachment structure.

4. The bicycle hub according to claim 3, wherein each of the first fixing sections includes a first spoke guide aperture aligned with the second spoke guide opening of a corresponding one of the fixing portions when assembled together, and
each of the second fixing sections includes a second spoke guide aperture aligned with the first spoke guide opening of a corresponding one of the fixing portions when assembled together.

5. The bicycle hub according to claim 4, wherein the first and second fixing sections of each of the fixing elements are constructed as separate elements.

6. The bicycle hub according to claim 3, wherein each of the fixing elements includes a connecting section non-movably fixed to the first and second fixing sections.

7. The bicycle hub according to claim 2, wherein each of the individual radially extending projections includes a pair of substantially circumferentially facing surfaces with the first and second spoke guide openings extending therefrom such that the first and second spoke guide openings of each of the fixing portions have first and second center axes arranged to define an obtuse angle as measured therebetween.

8. The bicycle hub according to claim 1, wherein each of the fixing portions includes a pair of individual radially extending projections with a first one of the projections having the first spoke guide opening formed therein and a second one of the projections having the second spoke guide opening formed therein.

9. The bicycle hub according to claim 8, wherein each of the radially extending projections includes a pair of substantially circumferentially facing surfaces with one of the first and second spoke guide openings extending therefrom such that the first and second spoke guide openings of each of the fixing portions have first and second center axes arranged to define an obtuse angle as measured therebetween.

10. The bicycle hub according to claim 1, wherein the hub shell includes a plurality of fixing portions disposed at opposite ends thereof, and each fixing portion is configured to attach one first spoke and one second spoke thereto via one of the fixing elements.

11. The bicycle hub according to claim 1, wherein the first and second spoke guide openings are unthreaded closed bores with each having a center axis.

12. The bicycle hub according to claim 11, wherein the fixing portions and the fixing elements are configured and arranged such that the inner end of the first spoke moves along the center axis of the first spoke guide opening when the inner end of the first spoke is removably attached to the first spoke attachment structure and such that the inner end of the second spoke moves along the center axis of the second spoke guide opening when the inner end of the second spoke is removably attached to the second spoke attachment structure.

13. The bicycle hub according to claim 1, wherein the fixing portions and the fixing elements are configured and arranged such that the fixing elements are moved into contact with the exterior surface of the hub shell when assembled together before the first and second spokes are attached to the first and second spoke attachment structures.

14. A bicycle hub comprising:
an axle;
a hub shell rotatably disposed about the axle, the hub shell having a plurality of fixing portions disposed at an end thereof, each of the fixing portions having a first spoke guide opening and a second spoke guide opening, the first and second spoke guide openings being unthreaded closed bores; and
a plurality of fixing elements removably coupled to the fixing portions of the hub shell, each of the fixing elements including a first threaded spoke attachment opening arranged to receive an inner end of a first spoke and a second threaded spoke attachment opening arranged to receive an inner end of a second spoke,
the first threaded spoke attachment opening of each of the fixing elements being aligned with the first spoke guide opening of a corresponding one of the fixing portions when assembled together, and the second threaded spoke attachment opening of each of the fixing elements being aligned with the second spoke guide opening of a corresponding one of the fixing portions when assembled together,
the fixing portions and the fixing elements being configured and arranged such that the fixing elements are non-rotatable relative to the fixing portions when assembled together before the first and second spokes are received in the first and second threaded spoke attachment openings.

15. The bicycle hub according to claim 14, wherein each of the fixing portions includes an individual radially extending projection having the first and second spoke guide openings formed therein.

16. The bicycle hub according to claim 15, wherein each of the fixing elements includes a first fixing section arranged on a first circumferential side of one of the radially extending projections when assembled together and a second fixing section arranged on an opposite circumferential side of the one of the radially extending projections when assembled together, and the first threaded spoke attachment opening is formed in the first fixing section and the second threaded spoke attachment opening is formed in the second fixing section.

17. The bicycle hub according to claim 16, wherein each of the first fixing sections includes a first spoke guide aperture aligned with the second spoke guide opening of a corresponding one of the fixing portions when assembled together, and
each of the second fixing sections includes a second spoke guide aperture aligned with the first spoke guide opening of a corresponding one of the fixing portions when assembled together.

18. The bicycle hub according to claim 17, wherein the first and second fixing sections of each of the fixing elements are constructed as separate elements.

19. The bicycle hub according to claim 16, wherein each of the fixing elements includes a connecting section non-movably fixed to the first and second fixing sections.

20. The bicycle hub according to claim 15, wherein each of the individual radially extending projections includes a pair of substantially circumferentially facing surfaces with the first and second spoke guide openings extending therefrom such that the first and second spoke guide openings of each of the fixing portions have first and second center axes arranged to define an obtuse angle as measured therebetween.

21. The bicycle hub according to claim 14, wherein each of the fixing portions includes a pair of individual radially extending projections with a first one of the projections having the first spoke guide opening formed therein and a second one of the projections having the second spoke guide opening formed therein.

22. The bicycle hub according to claim 21, wherein each of the radially extending projections includes a pair of substantially circumferentially facing surfaces with one of the first and second spoke guide openings extending therefrom such that the first and second spoke guide openings of each of the fixing portions have first and second center axes arranged to define an obtuse angle as measured therebetween.

23. The bicycle hub according to claim 14, wherein
the hub shell includes a plurality of fixing portions disposed at opposite ends thereof, and each fixing portion is configured to attach one first spoke and one second spoke thereto via one of the fixing elements.

24. A bicycle hub comprising:
an axle;
a hub shell rotatably disposed about the axle, the hub shell having a plurality of fixing portions disposed at an end thereof, each of the fixing portions having a first spoke guide opening and a second spoke guide opening, the first and second spoke guide openings being unthreaded closed bores; and
a plurality of fixing elements removably coupled to the fixing portions of the hub shell, each of the fixing elements including a first threaded spoke attachment opening arranged to receive an inner end of a first spoke and a second threaded spoke attachment opening arranged to receive an inner end of a second spoke,
the first threaded spoke attachment opening of each of the fixing elements being aligned with the first spoke guide opening of a corresponding one of the fixing portions when assembled together, and the second threaded spoke attachment opening of each of the fixing elements being aligned with the second spoke guide opening of a corresponding one of the fixing portions when assembled together,
the fixing portions and the fixing elements being configured and arranged such that each of the fixing elements contacts an exterior surface of the hub shell when assembled together, the exterior surface of the hub shell and the fixing elements being configured and arranged such that the fixing elements are movable radially inwardly from non-assembled positions into contact with the exterior surface of the hub shell.

25. A bicycle hub comprising:
an axle;
a hub shell rotatably disposed about the axle, the hub shell having a plurality of fixing portions disposed at an end thereof, each of the fixing portions having a first spoke guide opening and a second spoke guide opening; and
a plurality of fixing elements removably coupled to the fixing portions of the hub shell, each of the fixing elements including a first spoke attachment structure arranged to attach an inner end of a first spoke and a second spoke attachment structure arranged to attach an inner end of a second spoke,
the fixing portions and the fixing elements being configured and arranged such that each of the fixing elements contacts an exterior surface of the hub shell when assembled together,
the fixing portions and the fixing elements being configured and arranged such that the fixing elements are non-rotatable relative to the fixing portions when assembled together before the first and second spokes are attached to the first and second spoke attachment structures.

* * * * *